United States Patent [19]

Murai et al.

[11] Patent Number: 4,937,678

[45] Date of Patent: Jun. 26, 1990

[54] COLOR IMAGE ENLARGING INK JET PRINTER

[75] Inventors: Shuusei Murai, Kanagawa; Tadashi Kaiba, Tokyo, both of Japan

[73] Assignee: L.A.C. Corporation, Tokyo, Japan

[21] Appl. No.: 270,342

[22] Filed: Nov. 14, 1988

[30] Foreign Application Priority Data

| | | | |
|---|---|---|---|
| Nov. 13, 1987 | [JP] | Japan | 62-286984 |
| Nov. 19, 1987 | [JP] | Japan | 62-292590 |
| Mar. 2, 1988 | [JP] | Japan | 63-028363 |
| Mar. 4, 1988 | [JP] | Japan | 63-028807[U] |
| Apr. 27, 1988 | [JP] | Japan | 63-056797[U] |

[51] Int. Cl.[5] ........ H04N 1/034; H04N 1/46; H04N 1/393; G01D 15/18

[52] U.S. Cl. ........ 358/296; 358/77; 346/140 R; 346/75

[58] Field of Search ........ 346/140 R, 29, 75; 358/75, 77, 296; 400/126, 17, 18, 56; 364/520, 929.3

[56] References Cited

U.S. PATENT DOCUMENTS

| | | | |
|---|---|---|---|
| 2,278,940 | 4/1942 | Murphy | 358/77 |
| 3,553,371 | 1/1971 | Suenaga | 358/77 |
| 3,578,897 | 5/1971 | Stock | 358/77 |
| 4,580,914 | 4/1986 | Rich | 400/56 |

*Primary Examiner*—Bruce A. Reynolds
*Assistant Examiner*—Scott A. Rogers
*Attorney, Agent, or Firm*—Flynn, Thiel, Boutell & Tanis

[57] ABSTRACT

An automatic printing device according to this invention comprises a spray gun head ejecting ink jets of e.g. three primitive colors and black, a CPU processing image signals inputted from a television camera, a mechanism for driving 3-dimensionally the spray gun head, etc., and can print automatically an enlarged color image consisting of a number of pixels directly on a wall surface, etc. by the fact that the mechanism drives the spray gun head according to signals coming from this CPU.

15 Claims, 25 Drawing Sheets

COLOR IMAGE ENLARGING INK JET PRINTER

FIELD OF THE INVENTION

This invention relates to an automatic printing device capable of printing a color image directly on a wall surface, etc., while enlarging an original image.

BACKGROUND OF THE INVENTION

Hereto there exists no device capable of printing a color image directly on a wall surface, etc., of a building, etc., but it is adhered thereon after having once printed on a sheet of paper.

In this case, when a large image is divided into a number of small images, which are printed by means of a color pen device of ink jet system and since ejection of the ink is stopped for every small image, the small images gathered together are lacking in the unity of the tone.

A color enlarging printing device, as indicated in FIG. 11, is developed as a device capable of color-printing a large image at once.

In the figure, $A_1$ is a printing and recording portion and $A_2$ is an image inputting and editing portion. The printing and recording portion $A_1$ consists of a rotating drum G, a motor H, a guide rail I, a micro-spray-gun head J, etc. and the image inputting and editing portion $A_2$ consists of a camera A, a cylinder for original image B, and oscilloscrope for monitoring C, a control panel D, etc.

In the printing and recording portion $A_1$ the rotating drum G is supported rotatably by the motor H and the micro-spray-gun head J is disposed movably along the guide rail I in the direction of the length of the drum G.

The spray gun head J is so constructed that compressed air is injected therein so as to eject ink and the amount of ejected ink and therefore the light and shade in the image are adjusted by regulating the flow rate of the air, which is in turn regulated by an actuator.

The main scanning of the printing image is effected by the rotation of the drum G and the auxiliary scanning is effected by the movement of the spray gun head J. The spray gun is displaced from left to right by means of a belt, etc. by utilizing the rotation of the drum G by the motor H.

On the drum G is disposed a rotary encoder and depth signals for each color are read out from a buffer memory in synchronism with signals read out from this encoder. The actuator is driven, responding to these depth signals, so as to control the flow rate of the air injected into the spray gun head J.

On the other hand, in the image inputting and editing portion $A_2$ the cylinder B is mounted rotatably coaxially to the drum G and when an original image is mounted thereon and it is rotated, scanning of the original image with a narrow light beam begins, starting from a determined point on the original image. Light reflected by the original image changes without interruption due to the rotation thereof. The reflected light, whose intensity varies according to the original image with a high fidelity, is projected into the camera A, where is decomposed into the three primary colors and electric signals corresponding to the respective colors are generated. These electric signals are given to the buffer memory stated above and in this way ink, whose amount varies according to the intensity of these signals, is projected to the sheet of paper mounted on the drum G by the spray gun head J so that a color image is printed in an enlarged scale of the original image.

One of the most serious problematical points of the prior art enlarged image printing device described above is that the enlarged image can be printed only on a sheet of paper, but is not possible to print it directly on a wall surface, etc. of a building.

Further, since it uses a large rotating drum, which should be rotated with a high mechanical precison, and therefore the device for controlling the rotation of the large drum with a high precision is complicated, which makes it very expensive, practical usability thereof is bad and thus it is not widely used.

OBJECT OF THE INVENTION

The object of this invention is to provide an enlarged image printing device of relatively simple construction, which is not expensive and has a good practical usability, capable of printing an enlarged image directly on a wall surface, etc.

SUMMARY OF THE INVENTION

In order to achieve the above object an automatic printing device according to this invention is characterized in that it comprises control means for generating 3-dimensional driving signals and ink ejection amount signals for a spray gun head corresponding to the position and the color of each pixel in an original image; supporting means for supporting 3-dimensional movably the spray gun head with respect to an object surface, on which the image is to be printed, such as a wall surface; and means for driving the spray gun head stated above according to the 3-dimensional driving signals and at the same time projecting an ink jet to the object surface from the spray gun head, responding to the control signals stated above.

The spray gun head is driven successively to each position on the wall surface corresponding to each pixel in the original image and an amount of color ink corresponding to the color of each pixel and the depth thereof is projected so as to print directly a color image on the wall surface, enlarging the original image.

BRIEF DESCRIPTION OF THE DRAWINGS

FIGS. 47A and 47B are cross-sectional views of the nozzle portion of the spray gun indicated in FIG. 47 in an enlarged scale.

DETAILED DESCRIPTION

Figure 1:
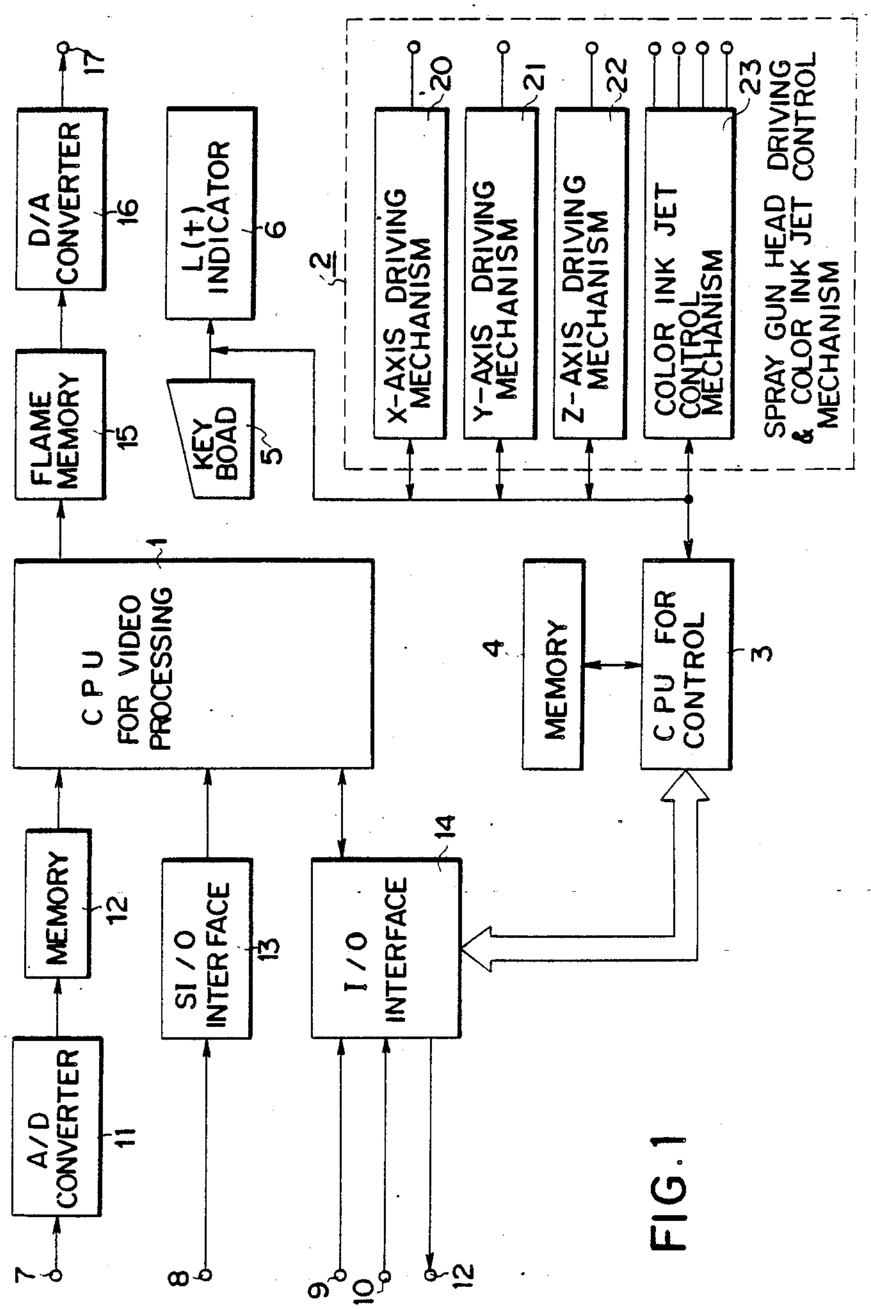
FIG. 1 is a block diagram illustrating the construction of an automatic printing device, which is an embodiment of this invention.
Figure 2:
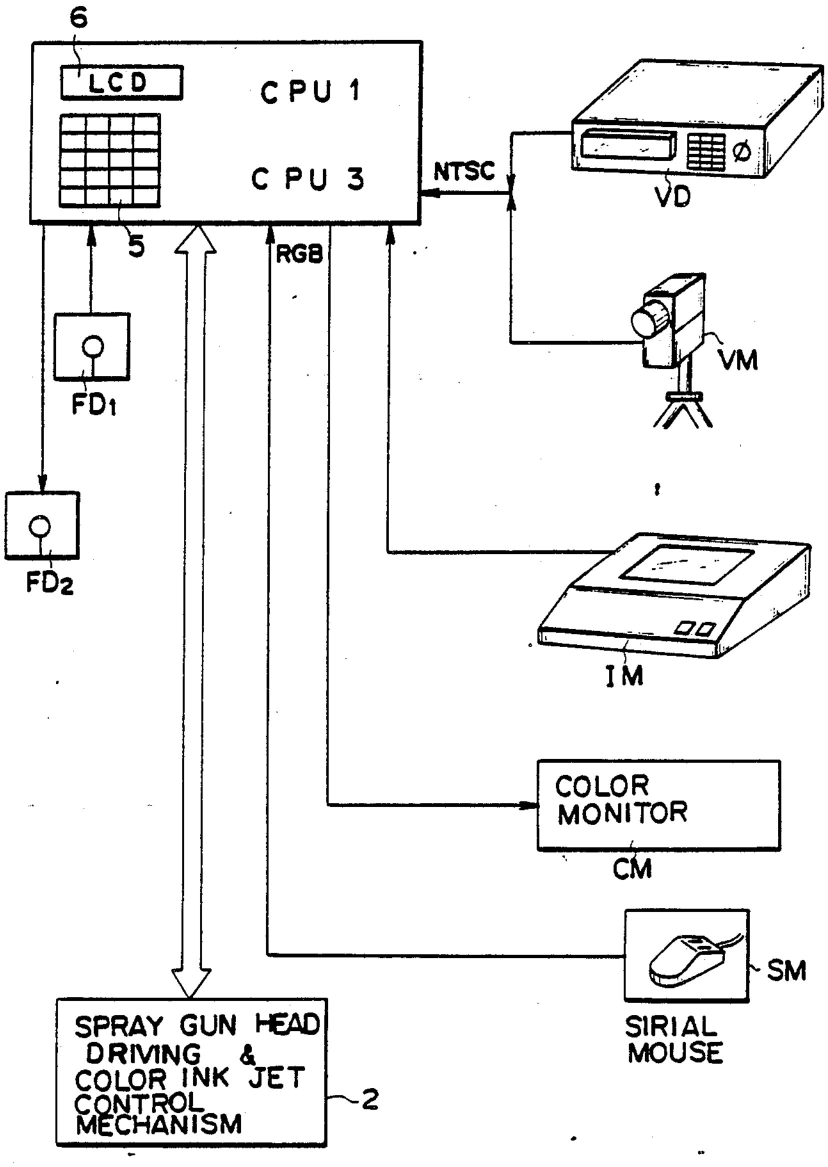
FIG. 2 is a scheme illustrating the construction of the device indicated in FIG. 1.
Figure 3:
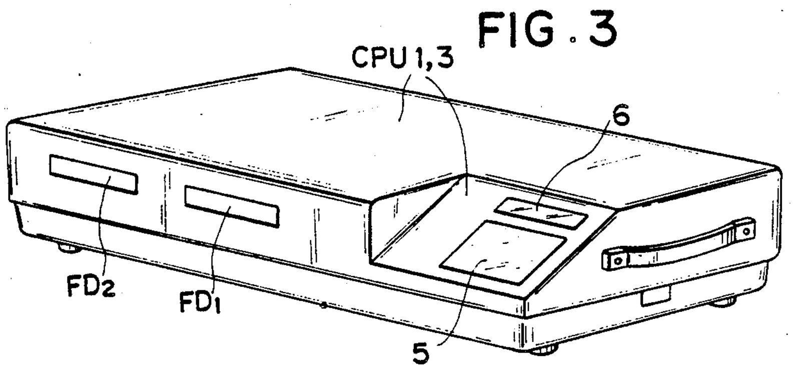
FIG. 3 is a perspective view of the device indicated in FIG. 1.

Hereinbelow this invention will be explained, referring to the preferred embodiments indicated in the drawings, in which FIGS. 1 to 3 show an embodiment of the automatic printing device according to this invention.

In FIG. 1 reference numeral 1 is a CPU for processing image data; 2 is a mechanism for controlling the driving of a spray gun head and the amount of ejected color ink; 3 is a mechanism for controlling the mechanism stated above; 4 is a memory; 5 is a key board for the manual operation of the mechanism stated above; 6 is an LCD display device for displaying the operation by means of the key board stated above; 7, 8, 9 and 10 are an NTSC input terminal, an image scanner input terminal, a mouse input terminal and a first floppy disk input terminal, respectively.

Further 11 is an A/D converter, 12 is a memory; 13 and 14 are an input and output portion; 15 is a frame memory; 16 is a D/A converter; 17 is a monitor output terminal; and 18 is a second floppy disk input terminal.

The mechanism 2 described above consists of an X axis and a Y axis driving mechanism 20 and 21, respectively, driving the spray gun head in the directions of the X and the Y axes with respect to the wall surface, a Z axis driving mechanism 22, an ejected color ink amount controlling mechanism 23, etc.

The input terminals 7 to 10 are so constructed that output signals coming from a video deck VD, video camera VM, an image scanner IM, a serial mouse SM and a first floppy disk $FD_1$ are inputted therethrough. These output signals, i.e. image data, are inputted in the image data processing CPU 1, by which signal processing such as edition of the image data, etc. is effected, so that the signals necessary for the imaging are given to the mechanism controlling CPU 3 through the input and output portion 14.

Further the image data processing CPU 1 stores imaging signals obtained by editing imaging data taken-in from each of the input terminals in a second floppy disk $FD_2$ through the output terminal 18 so that they can be used, if necessary. The imaging signals stated above are outputted from the output terminal 17 through the frame memory 15 and the D/A converter 16 so as to be able to be monitored by the color monitor CM.

Figure 4:
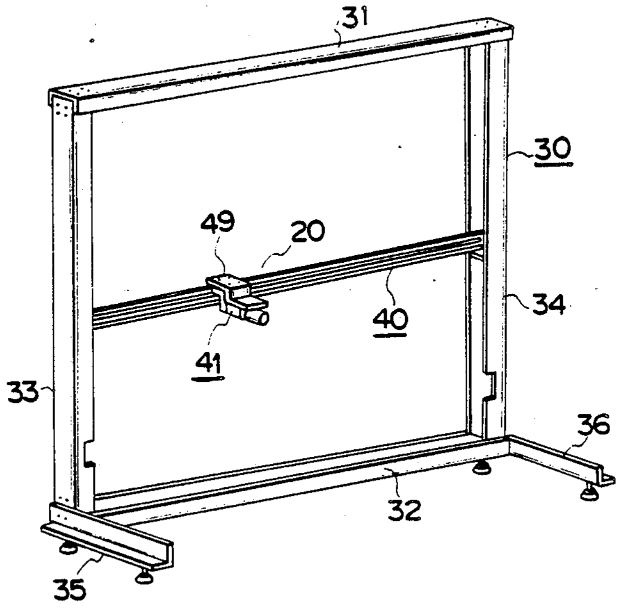
FIG. 4 is a perspective view of a frame used for realizing this invention.
Figure 5:
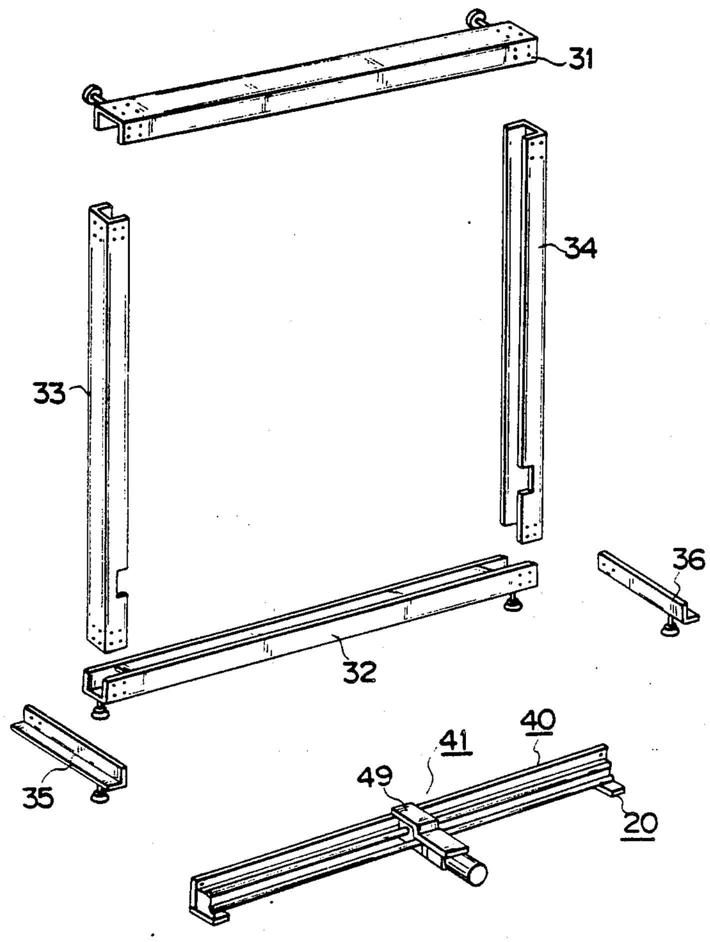
FIG. 5 is an exploded perspective view of the frame indicated in FIG. 4.
Figure 6:
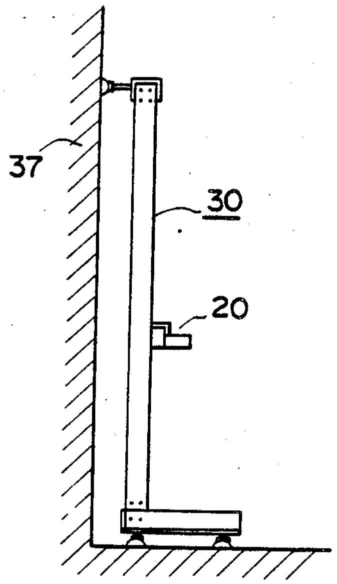
FIG. 6 is a side view of the frame indicated in FIG. 4.

The driving mechanisms for the spray gun head are disposed, opposite to a frame 30, e.g. as indicated in FIG. 4. The frame 30 is constructed by fastening an upper, a lower, a left and a right frame unit 31 to 34, a left and a right leg member 35 and 36 means of screws, as indicated in FIG. 5, and fixed with a constant interval to the wall surface 37 so as to be parallel thereto at a job site, as indicated in FIG. 6.

Figure 7:
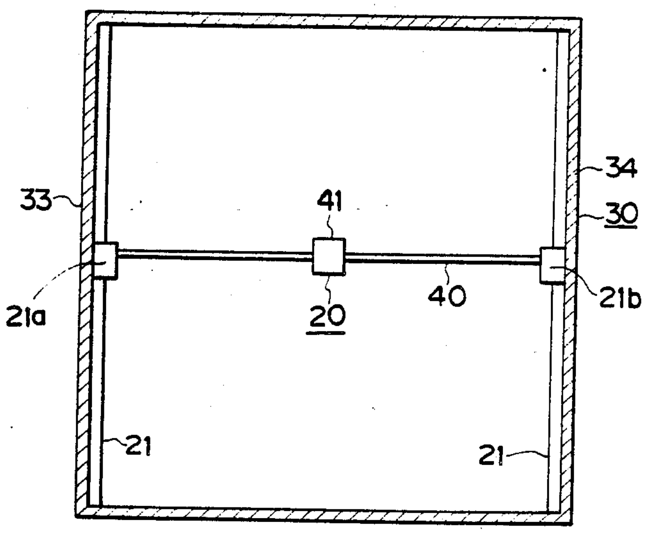
FIG. 7 is a plan view of an X–Y axis driving mechanism mounted on the frame indicated in FIG. 4.
Figure 8:
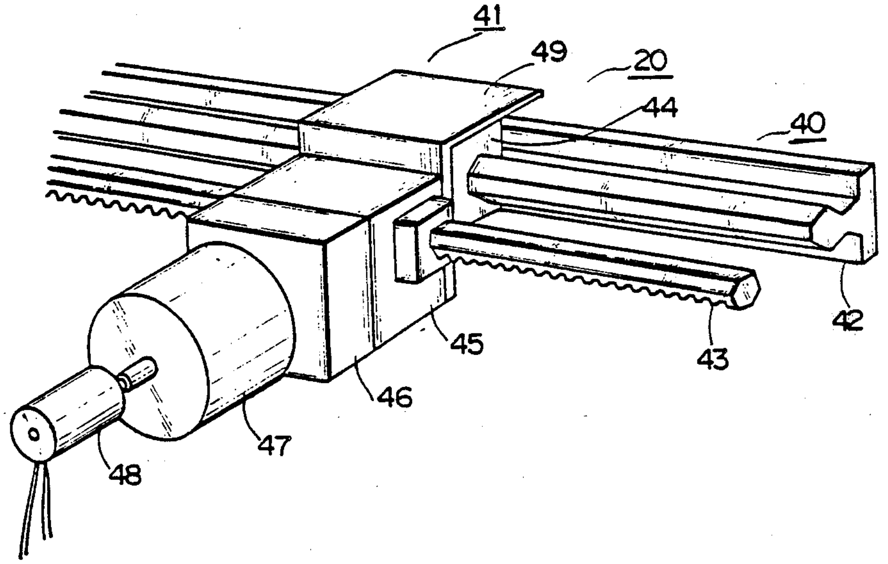
FIG. 8 is a perspective view of a part of the driving mechanism in an enlarged scale.

The X axis and Y axis driving mechanisms 20 and 21, respectively, are disposed, opposite to the frame 30, as indicated in FIG. 7.

The X axis driving mechanism 20 consists of a fixing portion 40 mounted on the frame 30 and a driving portion 41 moving along it. The fixing portion 40 includes a rail 42 and a rack gear 43. On the other hand the driving portion 41 is provided with a linear roller 44, a pinion gear 45, a reduction gear 46, a motor 47, a rotary encoder 48 and a 2-axial driving mechanism supporting carriage 49. The linear roller 44 is engaged with the rail 42, slidably along it, and the pinion gear 43 is engaged with the rack gear 43.

The motor 47 can move the Z axis driving mechanism supporting carriage 49 along the rail 42 in the direction of the X axis step by step of a predetermined distance by driving the pinion gear 45 through the reduction gear 46, responding to the X axis control signal coming from the CPU 3 stated above.

The Y axis driving mechanism 21 consists of Y axis driving units **21*a* and 21*b*, as indicated in FIG. 7, each of which has a structure almost identical to that of the X axis driving mechanism. These units are arranged on the left and the right frame units 33 and 34 and support the two extremities of the X axis driving mechanisms 20 so that they can move the X axis driving mechanism 20 in the direction of the Y axis (up and downward), responding to the Y axis controlling signal coming from the CPU 3**.

Figure 9:
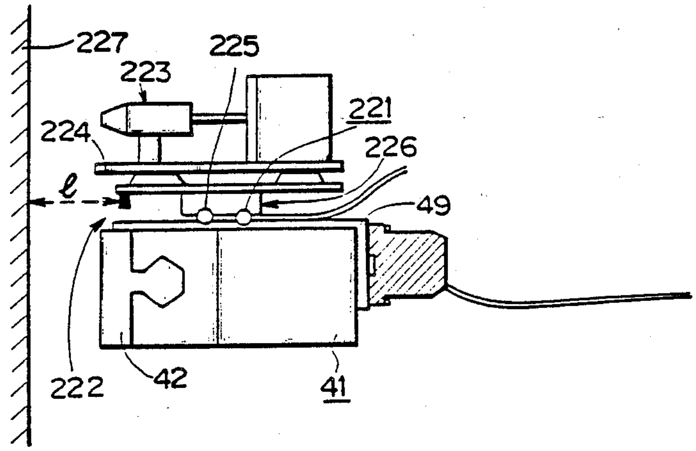
FIG. 9 is a schematized side view of a Z axis driving mechanism.

The Z axis driving mechanism 22 consists of a movable controller 221 mounted e.g. on a supporting carriage 49 for the X axis driving mechanism 20, a photosensor 222, a spray gun head 223, a spray gun supporting plate 224, etc., as indicated in FIG. 9. The movable controller 221 includes a roller 225 and a linear pulse motor 226 for controlling the position in the direction of the Z axis and controls the position of the spray gun head 223 so that the distance l therefore from a wall surface 227 is constant, by using instruction pulses from the CPU 3, responding to signals coming from the photosensor 222 mounted at the lower extremity portion of the supporting plate 224.

Figure 12:
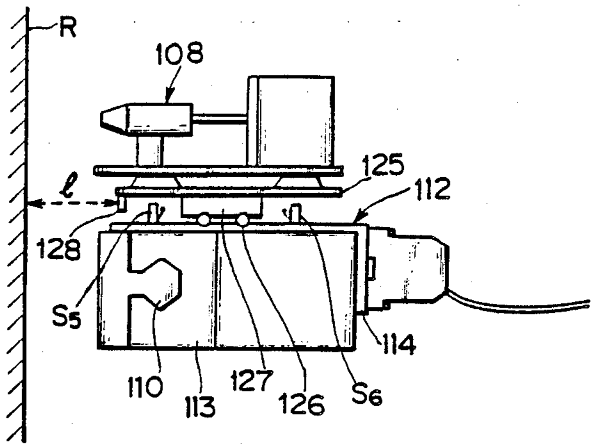
FIG. 12 is a side view of another example of the Z axis driving mechanism for a spray gun unit.
Figure 13:
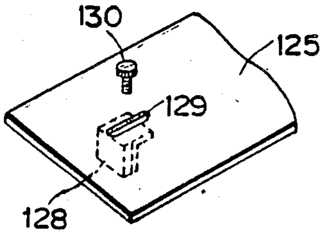
FIG. 13 is a perspective view of a part of the driving mechanism indicated in FIG. 12.
Figure 14:
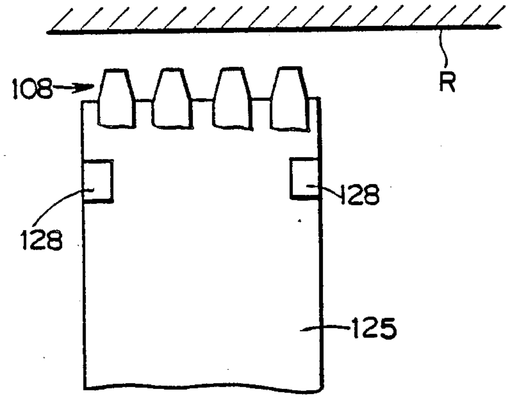
FIG. 14 is a plan view of a part of the driving mechanism indicated in FIG. 12.

The FIGS. 12, 13 and 14 show another example of the Z axis driving mechanism, which moves the spray gun unit (head) 108 forward and backward with respect to the wall surface R, on which the image is to be printed. The driving mechanism is composed of a carriage 125, which is mounted on a supporting plate 114 for a driving body 112 of the X axis driving mechanism stated above and on which the spray gun unit 108 is mounted, a roller 126, a linear pulse motor 127 and a photosensor 128 mounted on the carriage. The distance l therefrom to the wall surface R is detected the photosensor 128 and the carriage 125 is moved through a linear pulse motor 127 by the signal thus detected, so that the position of the spray gun unit 108 from the wall surface R is kept to be constant. The photosensor 128 is so constructed that the position, where it is mounted, can be regulated in the forward and backward direction by using a slit 129 formed in the carriage 125 and a fixing screw 130 engaged with the sensor therethrough. The sensor stated above is not necessarily a photosensor, but an ultra-sonic sensor, an infrared ray sensor, etc. may be used therefor.

Figure 15:
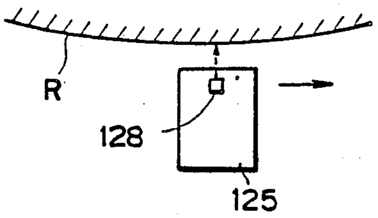
FIGS. 15 and 16 are schemes for explaining the operation of the driving mechanism indicated in FIG. 12.
Figure 16:
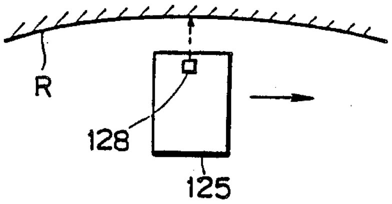

By using the Z axis direction driving mechanism, in which the photosensor 125 is mounted on the carriage 125 stated above and for which the distance the spray gun unit and the wall surface is kept to be constant owing to the detection signal thereof, even if the wall surface is a slightly curved convex or concave surface, as indicated in FIGS. 15 and 16, it is possible to move the spray gun unit, while keeping the distance thereof from the wall surface. $S_5$ and $S_6$ are limit switches for defining the displacement of the carriage 125.

Figure 17:
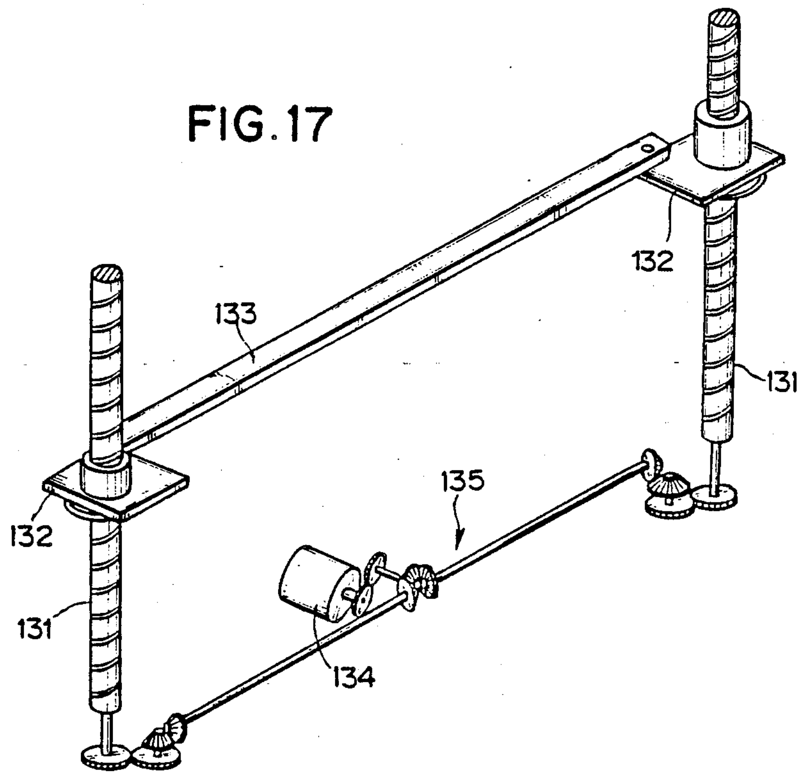
FIG. 17 is a perspective view of another example of the Y axis driving mechanism for the spray gun unit.

FIG. 17 shows another example of the Y axis direction driving mechanism. In the figure reference numeral 131 represents screws shafts mounted rotatably, standing at two positions with a necessary distance; 132 is a tapped body engaged with each of the screw shafts; 133 is a rail member connecting the two tapped bodies; 134 is a reversible motor; and 135 is a transmission gear mechanism transmitting the rotation of the motor to the screw shafts 131, a driving mechanism for the direction of the X axis similar to that described above being mounted on the rail member stated above.

In the driving mechanism for the direction of the Y axis the rotation of the motor 134 is transmitted simultaneously to the left and the right screw shafts and the rail member 133, on which the driving mechanism for the direction of the X axis is mounted, is moved in the up and downward direction by the rotation of the screw shafts 131. By using this driving mechanism for the direction of the Y axis it is possible to move simultaneously the two extremities of the rail member, on which the driving mechanism for the direction of the X axis is mounted, in the up and downward direction with only one motor.

Figure 18:
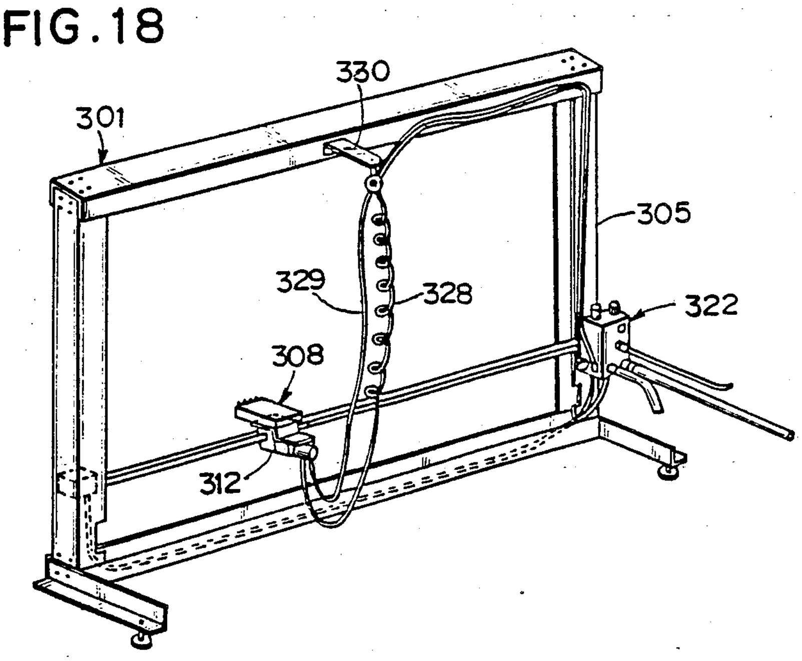
FIG. 18 is a perspective view for explaining a method for supplying compressed air to the spray gun unit.
Figure 19:
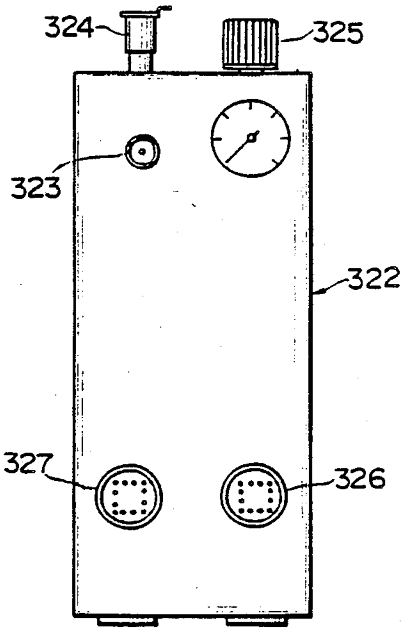
FIG. 19 is a front view of a device for supplying compressed air thereto.
Figure 20:
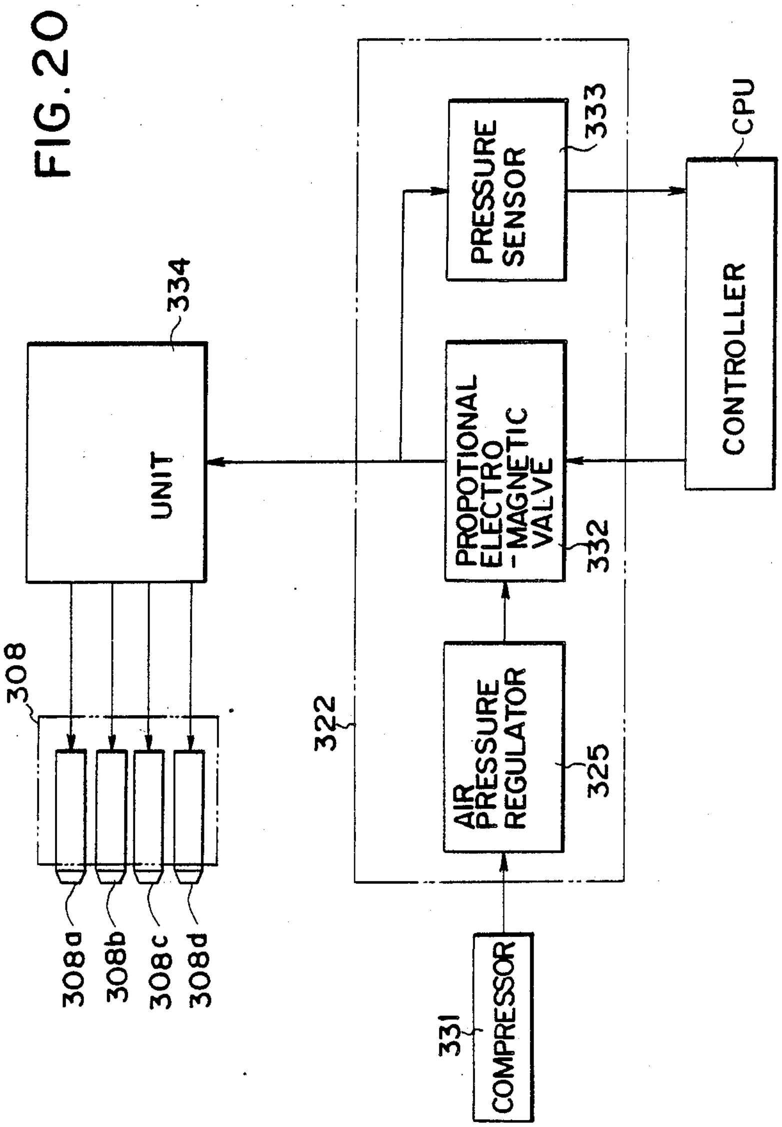
FIG. 20 is a block diagram for explaining a method for controlling each spray gun in the spray gun unit.

FIGS. 18, 19 and 20 show an example of the method for supplying compressed air to the spray gun unit and the method for controlling each of guns in the spray gun unit. In the figure a relay control box 322 is mounted on a frame unit 305 in a frame 301 for connecting a spray gun unit 308 and a driving portion 312 therefor with a compressed air supplying section and an electric control section. This relay control box 322 is provided with an air inlet portion 323 and an air outlet portion 324 for a compressor, an air pressure regulating portion 325, a power cable connector portion 326 and a sensor cable connector portion 327. A relaying air tube 328 and a cable 329 coming out from the relay control box 322 are connected with the spray gun unit 308 and the driving portion 312 therefor described above with a surplus length. 322 is a metal hanger for the air tube and the cable. The relay control box 322 is not necessarily mounted on the frame unit 305, but it may be mounted at any place on the frame.

FIG. 20 is a scheme showing a control system for supplying compressed air from the air compressor 331 to the spray gun unit 308 through the relay control box 322 stated above.

In the figure reference numeral 325 is the air pressure control portion, which cleans the compressed air (removes oil and moisture contained therein) and at the same time sets the input air pressure at a predetermined value ($5 \sim 10$ kg/cm$^2$). 322 is a proportional electromagnetic valve portion, which varies the air pressure applied to the spray gun nozzle according to a DC voltage controlled by the controlling CPU. 333 is a pressure sensor, which detects the output air pressure of the proportional electro-magnetic valve portion and sends it to the controlling CPU in the form of an electric signal. 334 is a ramifying section, which sends compressed air to spray guns 308*a*, 308*b* and 308*c* for the three primary colors and a spray gun 308*d* for black in the spray gun unit 308 while ramifying it.

In the case where an image is printed on a wall surface by means of the automatic printing device having the structure described above, the frame 1 is installed at a position opposite to the wall surface. Then the compressed air supplying tube from the compressor is connected with the air input portion 323 in the relay control box 322 and the power cable connector portion 326 and the sensor cable connector portion 327 are connected with the controlling CPU by means of cables.

Figure 10:
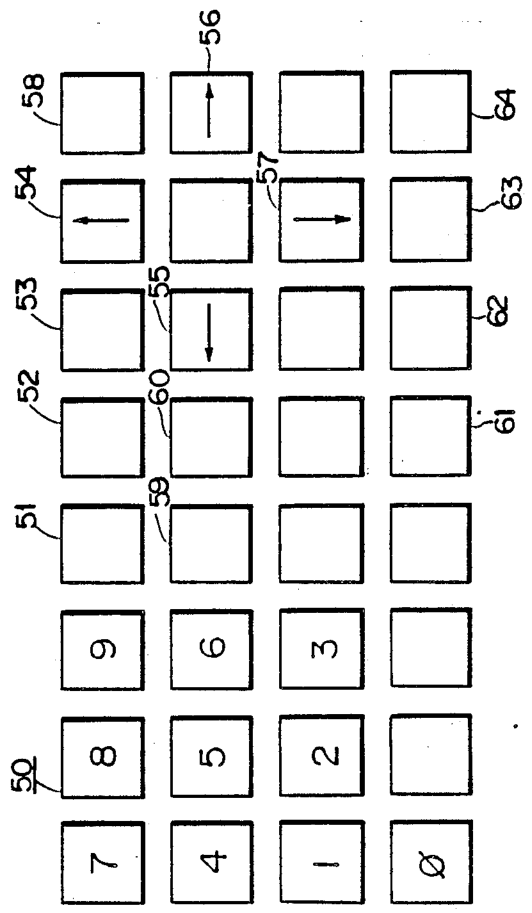
FIG. 10 is a plan view of a key board used for realizing this invention.
Figure 11:
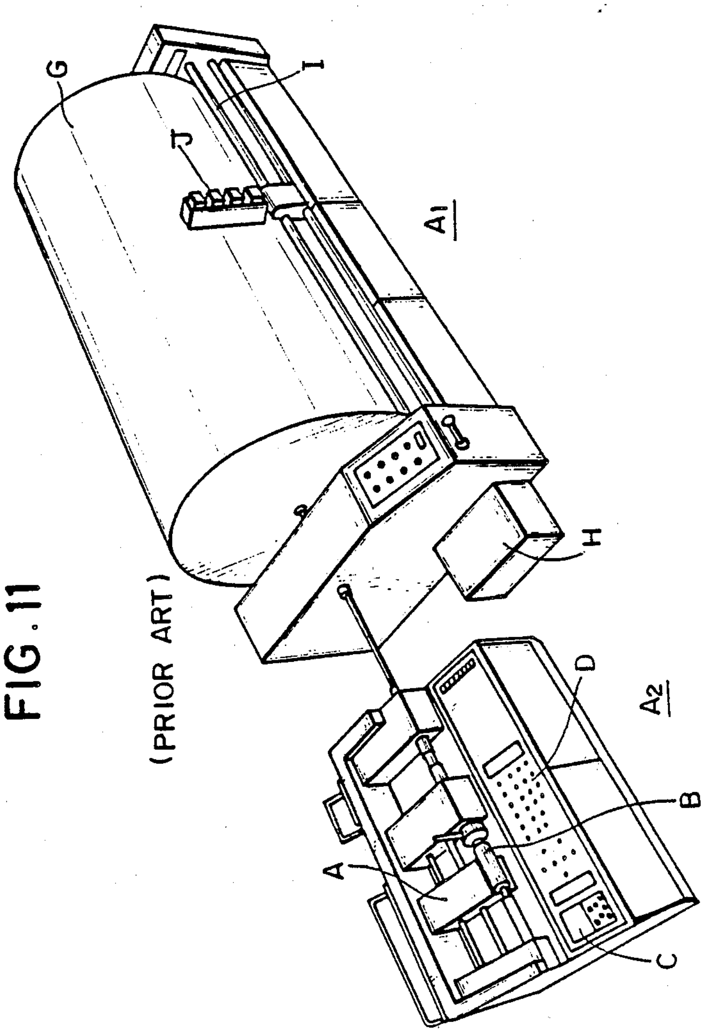
FIG. 11 (PRIOR ART)
FIG. 11 is a perspective view of a prior art color enlarged image printing device.

Now an example of the key board 5 for operating the automatic printing device according to this invention is shown in FIG. 10, in which reference numeral 50 indicates ten keys representing numerals of 0~9 and 51 to 54 are function keys having functions indicated in the figure, respectively.

The function keys 54 to 57 are used for moving the spray gun head 223 in the directions indicated by arrows, respectively. For example, when one of them is pushed down within a predetermined period of time, the spray gun head can be moved in the corresponding direction by one pixel and when it is pushed down over the predetermined period of time, the spray gun head can be moved with a high speed, until it is released.

The function key 51 is a key for executing a printing operation; the home position key 58 is one for moving the spray gun head 223 to the home position; the function key 60 is one for executing a mechanical test for the control mechanism 2; the function key 59 is one for instructing the spray gun head 223 to print a test pattern in order to check the ink ejection state thereof; the function key 52 is a temporary stop key for stopping temporarily an operation such as print, test print, mechanical check, home position, etc., when it is pushed down in the course of the execution thereof, and for beginning again the operation, when it is pushed down again; the function key 61 is a key for setting the air pressure for the spray gun head; the function key 62 is one for setting the operation starting position for the print; and the function key 63 is one for preventing plugging of the spray gun head 223 by ink. As far as this last key is pushed down, the head stated above can execute a spouting operation. The function key 64 is a key used for beginning the execution of the various operations indicated above or for inputting numerical data and the ten keys 50 are keys for inputting numerical values for setting the air pressure supplied to the spray gun head 223, etc.

In the automatic printing device, when the image signals corresponding to the original image, which is able to be printed, are inputted in either one of the input terminals 7 to 10, they are sent to the CPU 1, where they are dealt with, and the signals necessary for the print are given to the mechanisms controlling CPU 3. The CPU 3 sends drive control signals to the mechanisms 20, 21 and 22, responding to the signals described above, and the spray gun head 223 is driven in the directions of the X and Y axes, while keeping the distance thereof from the wall surface constant. The spray gun head ejects ink for every pixel in the image, an enlarged image of which is to be printed and moved successively to the next pixel.

In this case various kinds of maunual setting and regulation of the spray gun head necessary for the print are possible by operating the key board described above. Further, since the image signals in the course of the print are outputted through the monitor output terminal 17, it is possible to monitor the image, which is in the course of the printing.

Although, in the embodiment described above, the spray gun head is moved with respect to the wall surface by the driving mechanisms in the directions of the X, Y and Z axes supported by the frame, it is a matter of course that this invention is not limited to such a construction, but e.g. robot mechanisms can be used as well therefor.

Furthermore various kinds of structures can be used as the frame.

Figure 21:
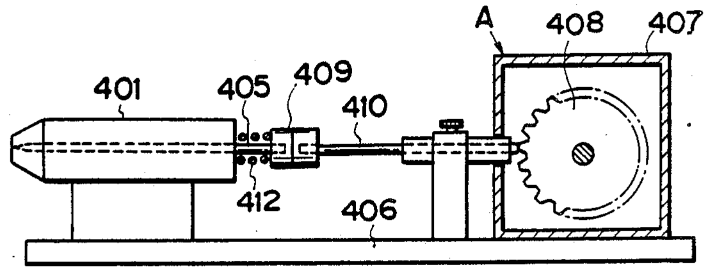
FIG. 21 is a side view of an ink spray gun device partially cut open.
Figure 22:
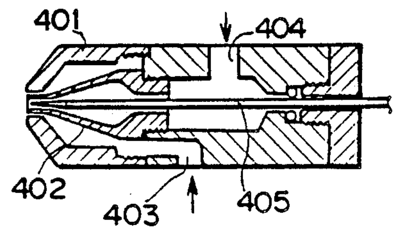
FIG. 22 is a cross-sectional view of the principal part of the gun in an enlarged scale.
Figure 23:
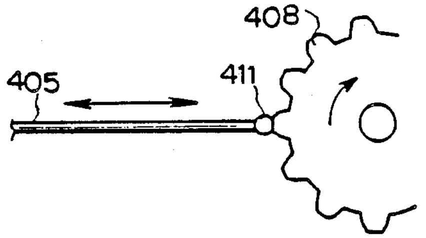
FIG. 23 is a side view of a mechanism portion for making the needle member in the gun go and come back.

FIGS. 21 to 23 show an embodiment of the spray gun device used in the automatic printing device described above. In the figure reference numeral 401 is a cylindrical main part of a spray gun. The cylindrical inner room thereof is divided coaxially by an inner cylinder 402 into two, i.e. an air room having an air inlet 403, which is on the outer side, and an ink room having an inlet, which is on the inner side. A needle member 405 is inserted in the center of the inner cylinder 402. The extremity of the inner cylinder and the tapered extremity portion of the needle member 405 are located coaxially at the extremity opening portion of the main part 401 so as to form an ink nozzle.

A driving mechanism A for moving forward and backward the needle member 405 is coupled with a movable table 406 supporting the needle member 405 stated above. 407 is a mechanical housing for the driving mechanisms A and 408 is a toothed wheel driven by a stepping motor. An extremity of a shaft 410 coupled with the needle member 405 through a joint 409 is contacted with the surface of teeth of this toothed wheel 408 through a steel ball 411 secured therewith, which is thrusted towards the surface of teeth by a spring 412.

In the spray gun device thus constructed, ink is ejected continuously from the nozzle by connecting the ink inlet 404 with an ink supplying portion and the air inlet 403 with an air compressor and by rotating the toothed wheel 408 by means of the motor with a predetermined speed.

That is, the needle member 405 is moved forward and backward by the rotation of the toothed wheel and the action of the return spring 412 and in this way the nozzle of the spray gun is opened and closed. The ink is ejected during a period of time, where the nozzle is opened.

Figure 32:
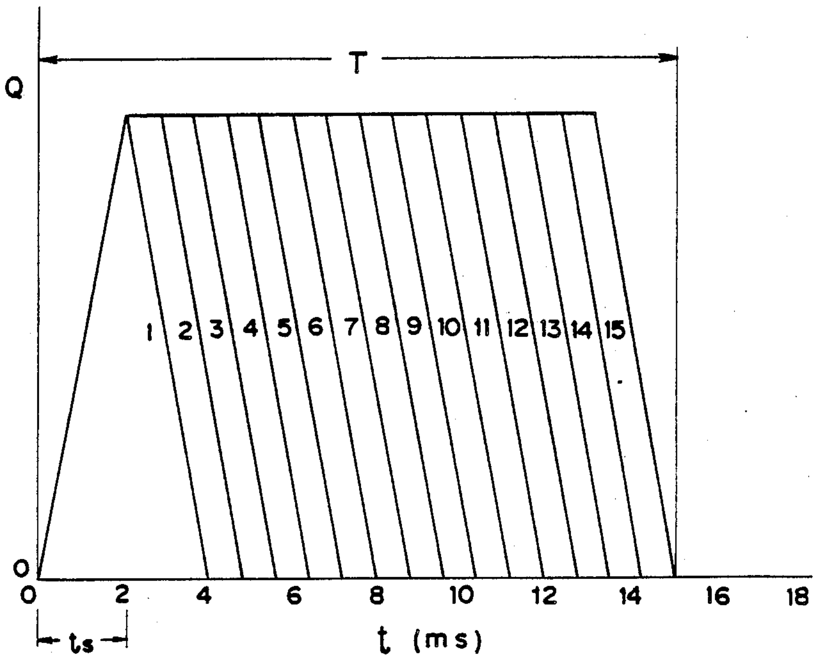
FIG. 32 is a graph showing variations in the tone of color obtained by varying the amount of ejected ink with respect to the nozzle control time.
Figure 34:
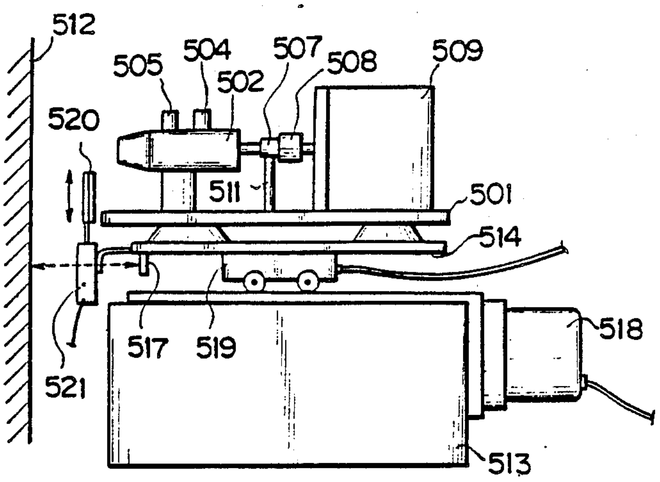
FIG. 34 is a side view of an ink spray gun device, which is still another embodiment of this invention.
Figure 35:
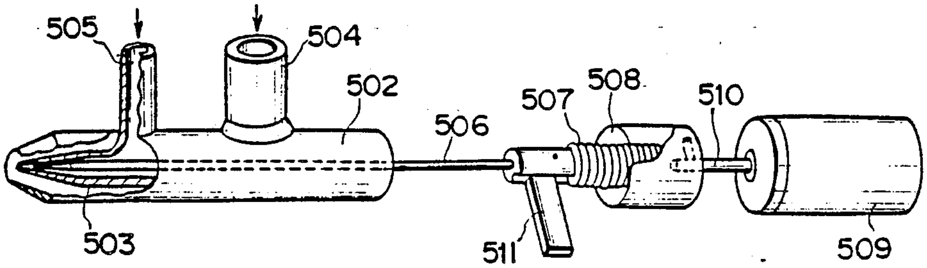
FIG. 35 is a perspective view of a spray gun partially cut open in the spray gun device indicated in FIG. 34.

FIG. 32 indicates variations in the tone of color due to variations in the ejected amount of ink with respect to the nozzle control time t, in which t, indicates the rise time. T represents a period of time necessary for printing one dot and numerical signs ① ~ ⑮ indicate grades of the tone of color. As indicated in this diagram of the tone of color, when the tone is zero, time lapses, while the nozzle is in the state where it is closed. For example, for effecting an ink ejection of a tone indicated by ⑩, after a rise time of 2 m sec it falls down after 7 m sec. This control of the tone of color is effected only by controlling the rotation of the stepping motor under a constant air pressure without changing the air pressure for the spray gun.

Figure 24:
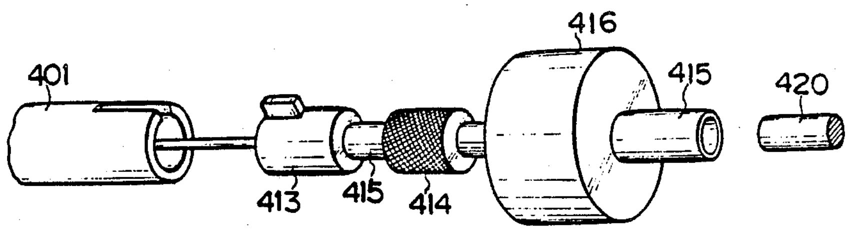
FIG. 24 is an exploded perspective view of a spray gun device, which is another embodiment of this invention.
Figure 25:
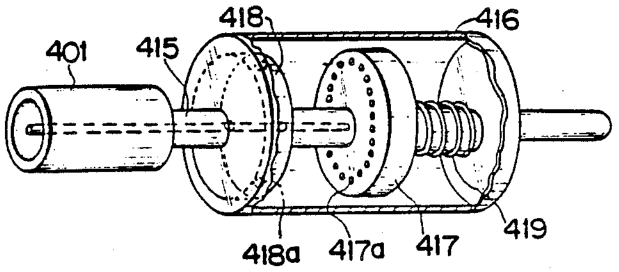
FIG. 25 is a perspective view of a ratchet mechanism portion partially cut open.
Figure 26:
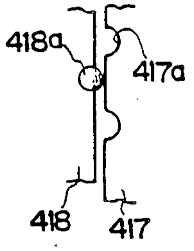
FIG. 26 is a side view of a ball falling and emerging portion for the ratchet mechanism portion indicated in FIG. 25 in an enlarged scale.

FIGS. 24 to 26 show another embodiment of the spray gun device according to this invention, in which reference numeral 413 is a stopper; 414 is a joint; 415 is a cylindrical shaft; 416 is a ratchet box; 417 is a movable ratchet plate; 418 is a fixed ratchet plate; 417*a* is receiving holes formed in the peripheral direction with a constant pitch on the surface of the ratchet plate 417; 418*a* is a ball disposed on the surface of the ratchet plate 418; 419 is a return spring; and 420 is a motor shaft. The movable ratchet plate 417 is moved forward and backward in the axial direction by the falling and emerging action of the ball 418 disposed on the ratchet plate 418a into and from the receiving holes 417a formed in the ratchet plate 417 due to the rotation of the cylindrical shaft 415 coupled with the motor shaft 420 and the action of the return spring 419. This forward and backward movement is transmitted to the needle member 405 so that the ink is ejected continuously.

Figure 27:
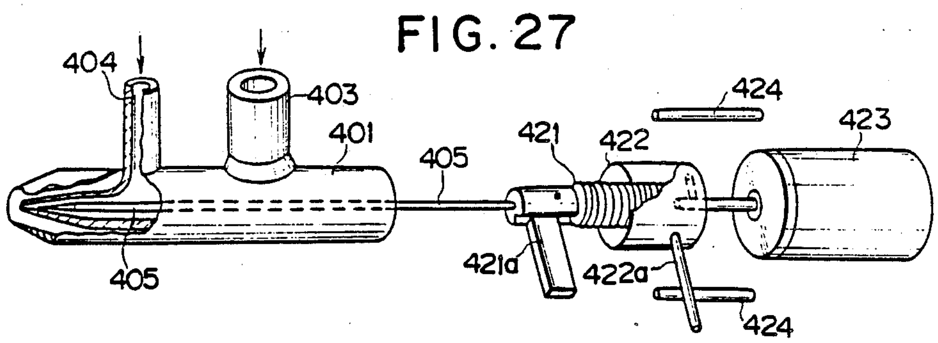
FIG. 27 is a perspective view of a spray gun device partially cut open, which is another embodiment of this invention.

FIG. 27 shows still another embodiment of the spray gun device according to this invention, in which reference numeral 421 is a threaded shaft coupled with the needle member; 422 is a tapped cylinder engaged therewith; 423 is a rotating type solenoid body for moving forward and backward and rotating the tapped cylinder; 421a is a stopper for the threaded shaft; 422a is a lever serving as a stopper and protruding from the threaded cylinder; and 424 is a stopper. The needle member 405 is moved forward and backward by the helical movement of the tapped cylinder 422 and the threaded shaft 421 due to forward and backward rotation of the rotating type solenoid body 423 so that the ink is ejected continuously.

Since the rotating type solenoid body 423 has characteristics that the response to the controlling power source is rapid, it is possible to eject from the nozzle an amount of ink corresponding to a digital value set with a high speed by detecting the rotational angle thereof by means of a potentiometer and by effecting a positional comparison.

Figure 33:
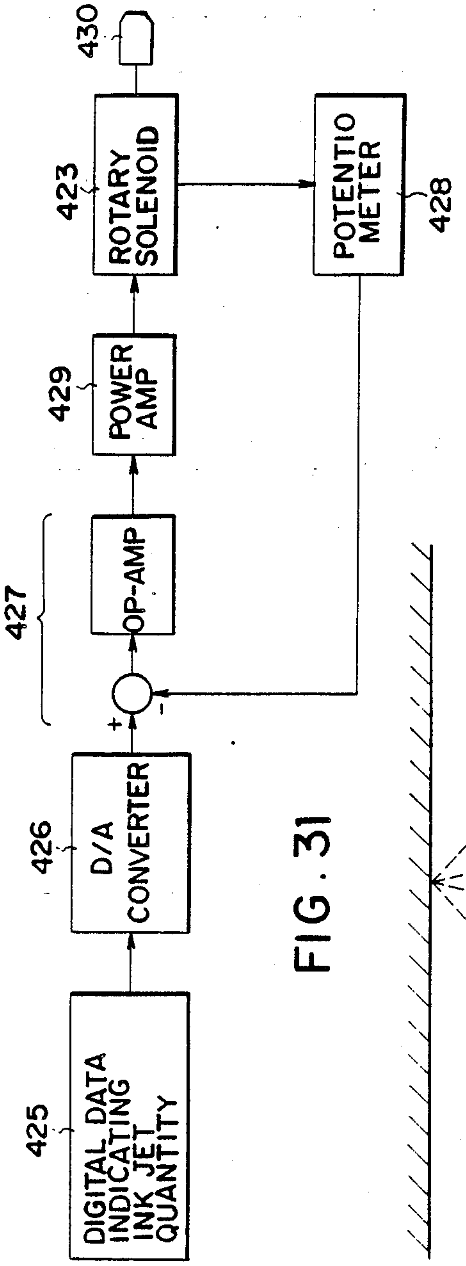
FIG. 33 is a block diagram illustrating the construction of an ink ejection control device using a rotating type solenoid member.

FIG. 33 is a block diagram showing an example of the method for controlling the ink ejection using the rotating type solenoid member. In the figure reference numeral 425 is an ejected amount instruction digital data section, in which data are given in the binary code of 4 bits so that the ejected amount can be varied in 16 grades (tone of color). When instruction data of the ejected amount is given by an operator, it is converted into an analogue value by a D/A converter 426, whose data are compared with the voltage in a potentiometer 428 by an adding circuit 427. The result of the comparison is inputted in the rotating type solenoid member 423 by a power amplifier 429. In this way the nozzle 430 of the spray gun is opened and closed and at the same time the potentiometer (position sensor) 428 is also driven so as to be rotated around the same axis. The rotational angle thereof is transformed into a voltage and outputted from the potentiometer 428. It is then compared with a reference value in the adding circuit 427. When it reaches a predetermined output voltage, this closed loop 427 - 429 - 423 - 428 is stabilized so that the spray gun is stopped there and the amount ejected by the nozzle is controlled.

Figure 28:
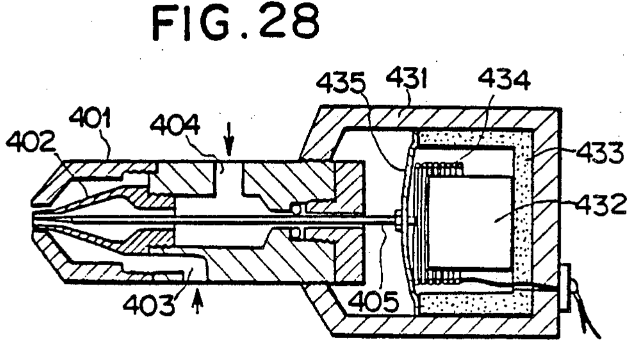
FIGS. 28 to 30 are longitudinal cross-sectional views of spray gun devices, which are other embodiment of this invention, each of which is provided with a solenoid member.
Figure 29:
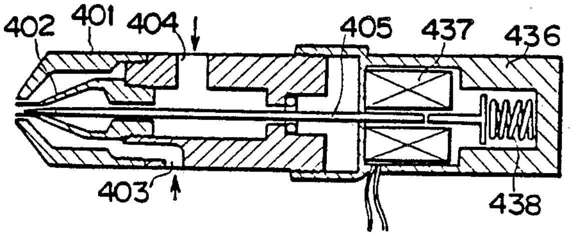
Figure 30:
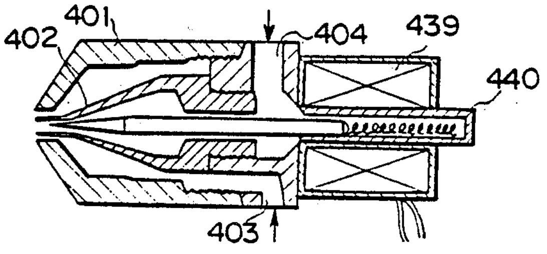

FIGS. 28 to 30 show three different spray gun devices driven by solenoids, which are other embodiments of this invention.

The device indicated in FIG. 28 is so constructed that a magnet 432, a yoke 433, a coil 434 and a vibrating plate 435 are mounted in a mechanical housing 431 disposed in the rear part of the principal part 401 of the spray gun and a needle member 405 is coupled with the vibrating plate 435 so that the displacement amount of the needle member can be controlled by varying the intensity of the current flowing through the coil.

The device indicated in FIG. 29 is so constructed that the needle member 405 is moved forward and backward by a solenoid coil 437 and a spring 438 mounted in a mechanical housing 436.

The device indicated in FIG. 30 is so constructed that a spring made of a non-magnetic material working together with a solenoid coil 439 is buried in the ink room together with the needle member 405. According to this structure, since the needle member is not in contact with packing for seal in the spring room, the resistance by friction is small and thus it is possible to control the needle member with a relatively small power.

Figure 31:
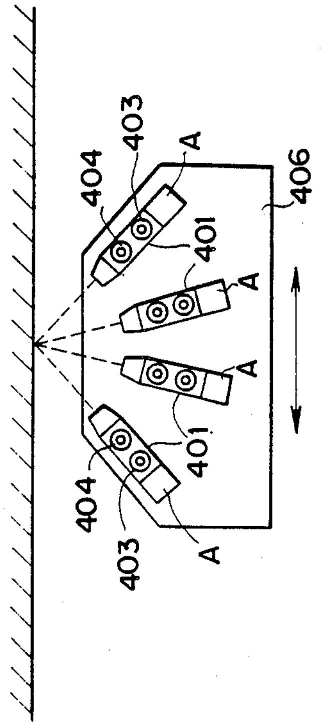
FIG. 31 is a plan view of the principal part of a spray gun device having a concentration type arrangement construction.

The device indicated in FIG. 31 is an embodiment of this invention, in which a plurality of principal parts of spray nozzle are combined. That is, four principal parts of spray nozzle 401, each of which is provided with a vibration generating mechanism A, are mounted on a movable plate 406 in such angular positions that their directions of ejection pass through a common point.

According to this concentration type arrangement structure, since a desired color can be obtained by one ejection operation by mixing the three primitive colors. it can be expected to increase remarkably the printing operation efficiency with respect to the operation to mix the primitive colors by displacing separately the principal parts of spray nozzle of different colors.

Although, in the above, various kinds of embodiments are described, apart from the method, by which the ink ejection time is controlled by opening the nozzle for one pixel, the control of the ejected amount of ink by moving forward and backward the needle member in order to obtain different tones of color can be effected also by a method, by which the number of openings and shuttings of the nozzle for one pixel by means of the needle member is controlled, or by another method, by which the ink ejection area is controlled on the basis of variations of the tapered extremity portion due to displacement of the needle member. These methods can be selected appropriately to be applied thereto.

As explained above, since the spray gun device described above, in which ink is pulverized from the nozzle by the force of ejected air, is so constructed that the driving mechanism for moving forward and backward the needle member disposed in the nozzle of the spray gun is mounted within the spray gun, it is possible to control easily the ejected amount of ink necessary for obtaining a desired tone of color with a high precision under a constant air pressure.

In the spray gun device described above, in order to prevent plugging by ink, a false ink spray is effected e.g. after the termination of printing of one line. Since in a prior art device this false ink spray was effected towards a part of the area, where an image was to be printed, there was a disadvantage that the area, where the image was printed, became narrower corresponding thereto.

FIGS. 34 to 39 show an ink spray gun device, which effects no false ink spray in the area, where an image is to be printed, and is capable of effecting arbitrarily the false ink spray independently of the displacement position of the spray gun.

In the figures, reference numeral 501 is a base plate and 502 is a cylindrical main part of the spray gun mounted on the base plate. The cylindrical inner room of the main part 502 of the spray gun is divided coaxially by an inner cylinder 503 into two, i.e. an air room having an air inlet 504, which is on the outer side, and an ink room having an ink inlet 505, which is on the inner side. A needle member 506 is inserted in the center of the inner cylinder 502. This needle member 506 and the inner cylinder 503 form an ink nozzle at the extremity of the main part 502.

On the base plate 501 stated above is disposed a driving porition for moving forward and backward the needle member 506 in the main part of the spray gun. That is, 507 is threaded screw shaft secured to the needle member; 508 is a tapped cylinder engaged therewith; and 509 is a stepping motor for rotating forward and backward the tapped cylinder. A rotating shaft is coupled with the tapped cylinder 508 and a stopper 511 is engaged with the threaded screw shaft 507, which allows it to move in the axial direction, but restricts its rotation. When the stepping motor 509 rotates forward and backward, the needle member 509 moves forward and backward by the helical movement of the threaded screw shaft 507 and the tapped cylinder 508 and tghe ejected amount of ink from the nozzle of the main part 502 of the spray gun is regulated in this way.

Figure 36:
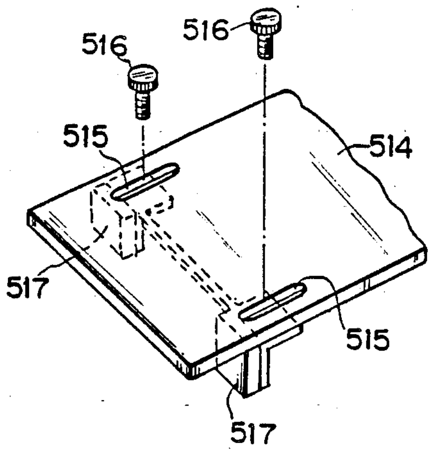
FIG. 36 is a perspective view of the principal part of a rack for the spray gun indicated in FIG. 35.

The main part 502 of the sprat gun is so constructed that it can be moved along the X axis line, which is the left and right direction, the Y axis line, which is the up and down direction, and the Z axis line, which is the forward and backward direction, with respect to a surface 512, on which an image is to be printed. 513 is an X axis driving unit and 514 is a Z axis driving carriage. On this carriage 514 is mounted movably a photosensor 517 by a slit 515 and a guiding screw 516, as indicated in FIG. 36, opposite to the surface 512, on which the image is to be printed. The photosensor detects the distance thereof from the surface, on which the image is to be printed, and detection signals are sent to the control portion through a sensor amplifier 518. In this way the carriage 514 is displaced to a predetermined distance from the surface, on which the image is to be printed, by a linear pulse motor 519.

On the carriage 514 are mounted a shutter 520, which can be moved arbitrarily in front of the nozzle of the main part 502 of the spray gun and a driving portion 521 for driving it. The shutter 520 is plate-like and a plunger is used for the driving portion 521.

When an ink spray gun device constructed as described above is used, it is possible to print an image by ink ejection on the surface, on which the image is to be printed, by moving the main part 502 in a direction previously set while ejecting ink from the nozzle of the main part 502 of the ink spray gun.

When a false ink ejection is effected e.g. after the termination of the printing of one line in order to prevent the plugging by ink of the main part 502 of the ink spray gun, the shutter 520 is moved to the front of the nozzle of the spray gun, driven by the driving portion 521. In this way the shutter 520 appears in front of the nozzle and the false ink ejection is effected thereto. By this method, since it is not necessary to dispose a false ink ejection area, the whole area can be used efficiently as an area, on which the image is printed.

Figure 37:
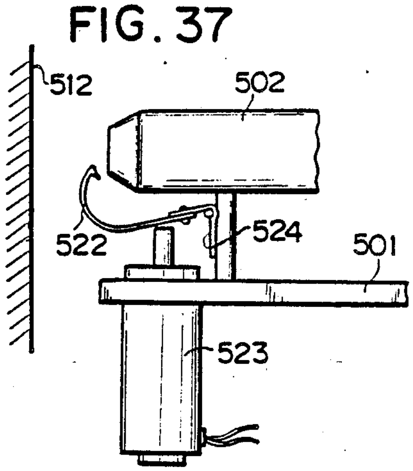
FIG. 37 is a side view showing the principal part of an ink spray gun device, which is still another embodiment of this invention.
Figure 38:
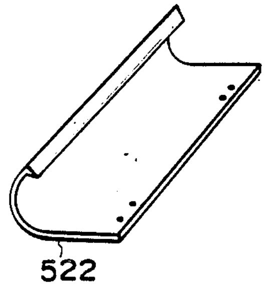
FIG. 38 is a perspective view of a shutter used in the ink spray gun device indicated in FIG. 37.
Figure 39:
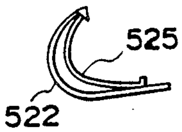
FIG. 39 is a side view of the shutter indicated in FIG. 38.

FIGS. 37 to 39 show another embodiment of the invention, in which 522 is a shutter and 523 is a driving portion. The surface of the shutter 522, on which ink is projected, is an arc-shaped curved surface and the base portion thereof is mounted rotatably on the base plate by means of a hinge 524. A solenoid is used for the driving portion 523 and the shutter 522 is displaced to the front of the nozzle of the spray gun by operating the driving portion 523. Further by using the arc-shaped curved shutter 522 an effect is obtained that dispersion of pulverized ink at the ink ejection is prevented and drop out of stuck ink is also prevented. Furthermore, if a sheet of paper 525 such as blotting paper is disposed on the inner surface of the shutter so as to be able to be exchanged freely, it is possible to save time to clean the shutter to remove stuck ink.

As described above, by using the device indicated in FIGS. 34 to 39, since the spray gun is provided with a shutter, which can be moved arbitrarily to receive ink ejected by the nozzle, and a driving portion for driving it, a false ink ejection can be effected arbitrarily, independently of the displacement position of the spray gun and the false ink ejection in an area, on which an image is to be printed, can be eliminated so that the area can be utilized efficiently.

Figure 40:
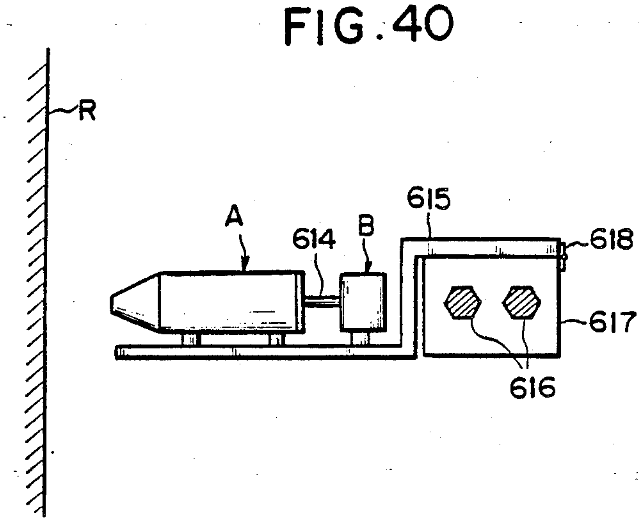
FIG. 40 is a side view of an ink spray gun device, which is still another embodiment of this invention.
Figure 41:
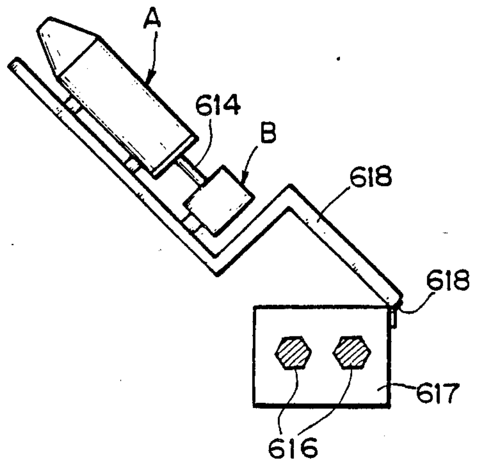
FIG. 41 is a side view of an ink spray gun unit directed obliquely upward of the ink spray gun device indicated in FIG. 40.
Figure 42:
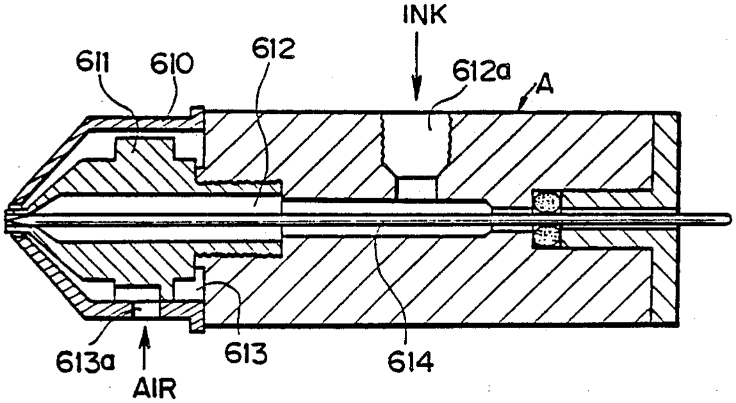
FIG. 42 is a longitudinal cross-sectional view showing the main part of a spray gun in the ink spray gun device indicated in FIG. 40 in an enlarged scale.

FIGS. 40 to 42 show an embodiment of the spray gun device according to this invention, which is so cpnstructed that there exist no bubbles in the ink within the main part of the gun.

In the figures A represents a cylindrical main part of the spray gun, which consists of an outer cylinder portion 610 and an inner cylinder portion 611, and the cylindrical inner room thereof is divided into an ink room 611, which is on the inner side, and an air room 613, which is on the outer side. The extremities of the two rooms form a coaxial nozzle. The ink room 612 is connected with an ink inlet 612*a* and the air room 613 is connected with an air inlet 613*a*. A needle member 614 for regulating the amount of ink ejected by the nozzle is inserted slidably in the ink room 612.

The main part A of the spray gun described above is mounted on a work table 615 and the needle member 614 protruding outward fromo the rear portion of the main part A of the spray gun is linked with a driving mechanism B disposed on the work table 615.

The work table 615 supporting a spray gun unit consisting of the main part A of the spray gun and the driving unit B described above is supported by a moving body 617, which can be moved arbitrarily in the horizontal direction along a rail 616 and by a hinge 618 so that the inclination can be varied freely.

The moving body 617 displaces the spray gun unit in the horizontal directions (X axis direction) and if it is combined with means for displacing it in the vertical direction, it is possible to displace it also in the Y axis direction.

For printing an image e.g. on a wall surface of a building by using the spray gun device constructed as described above, the main part A of the spray gun is positioned in a nearly horizontal posture in front of the wall surface R, as indicated in FIG. 40, and ink is ejected from the nozzle of the main part A of the spray gun towards the wall surface. The tone of color of the ink on the wall surface is regulated by adjusting the ejected amount of ink corresponding to the nozzle control time by the forward and backward movement of the needle member 614.

When an image is printed by using the main part A of the spray gun described above, the ink is poured and stored in thee main part of the spray gun. When the ink is poured therein, the work table 615 is rotated around the hinge 618 so that the main part A of the spray gun is kept in a posture directed obliquely upward and the ink is poured in the ink room 612 through the ink inlet 612*a* in this posture.

When the ink is poured in the main part A of the spray gun kept in the posture directed obliquely upward, bubbles of air admixed in the ink at the pour of the ink rise in the liquid ink. In this way, they are exhausted over the surface of the liquid and emerge to the outside through the nozzle so that the ink is stored, leaving no air bubbles therein.

In addition, if the ink room 612 is so constructed that its wall surface is straight and smooth without unevenness at least at the ink path in the main part A of the spray gun, as indicated in FIG. 42, rise of the air bubbles is not hindered in the course and thus it is possible to discharge them smoothly over the surface of the liquid.

As described above, according to the construction of the spray gun device, since the ink spray gun for printing images is disposed on the work table mounted on the movable body so as to be able to vary the inclination, it is possible to keep the main part in a posture directed obliquely upward so that bubbles of air admixed in the ink rise easily to be discharged to the outside, when the ink is poured in the main part of the spray gun.

Consequently, by using the ink spray gun according to this invention, since it is possible to prevent plugging of the nozzle produced by the fact that the ink is solidified by remaining air bubbles in the ink room in the main part of the ink spray gun, work for removing the plugging can be omitted, which contributes significantly to the improvement of the efficiency of the printing work.

Figure 44:
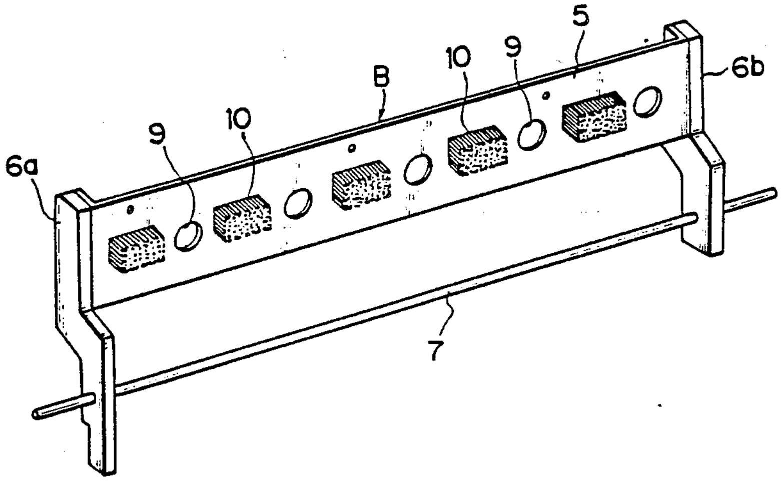
FIG. 44 is a perspective view of a brush unit used in the ink spray gun device indicated in FIG. 43.
Figure 43:
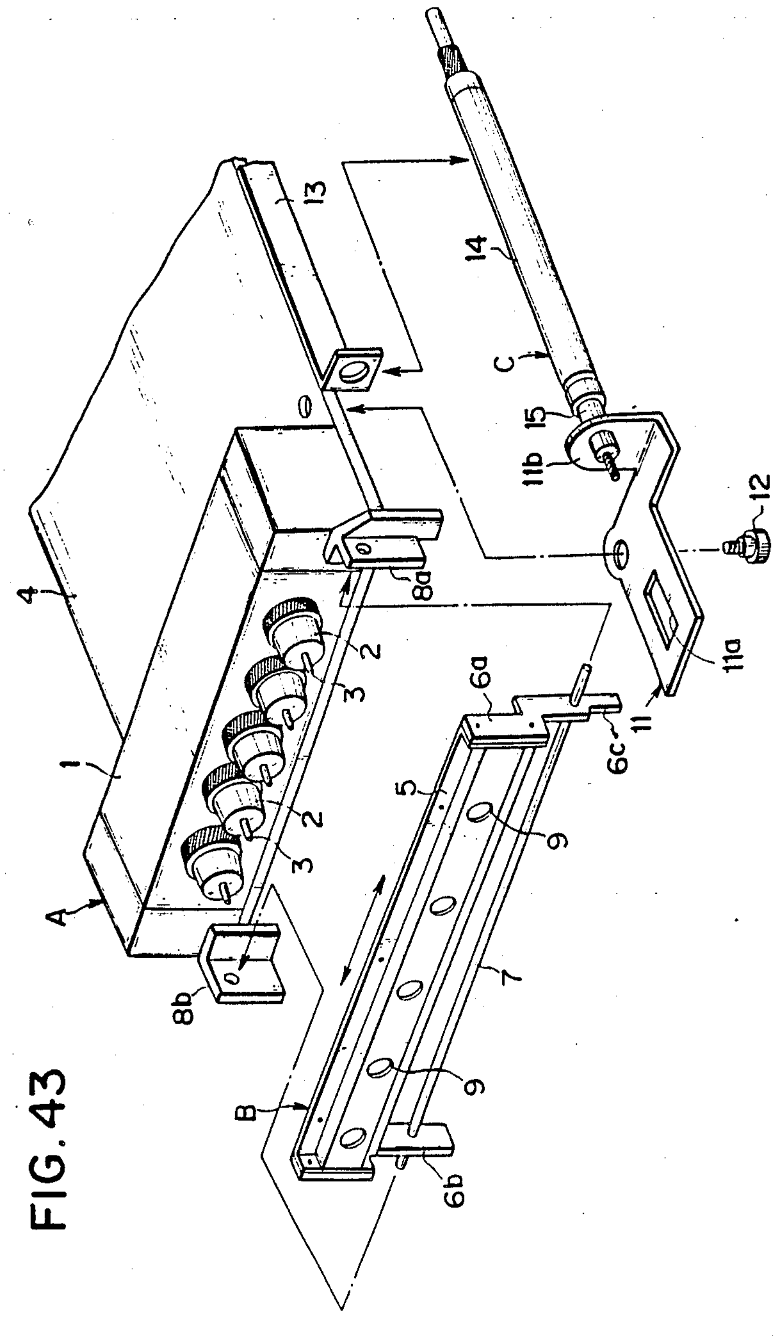
FIG. 43 is an exploded perspective view of an ink spray gun device, which is still another embodiment of this invention.

FIGS. 43 and 44 show still another embodiment of the spray gun device according to this invention provided with a mechanism, which can easily clean the spray gun at the site of the printing work.

In the figures, A represents a spray gun unit, which is so constructed that a plurality of spray guns 702 are arranged in parallel in a casing 701 and that the nozzles 703 of the spray guns protrude outside of the casing. Further the casing 701 is mounted on a movable body 704 so that it can be moved in the horizontal direction along a guiding rail not shown in the figures, as described previously.

On the movable body 704 is mounted a brush unit B movably in the horizontal direction in front of the nozzles in the casing 701. 705 is a screen plate constituting the brush unit B and 706*a* and 706*b* are sleeve plates disposed at the two extremities thereof. The screen plate 705 can be moved freely in the horizontal direction in front of the nozzles of the spray gun unit by supporting the two extremities of a shaft 707 passing through the two sleeve plates 706*a* and 706*b* by receiving frames 708*a* and 708*b* fixed to the movable body 704 stated above, the two extremities being made pass through the receiving frames 708*a* and 708*b*.

In the screen plate 705 are formed openings 709 at positions with the same pitch as that for the nozzles of the spray guns arranged in parallel, through which openings ink ejected by the nozzles pass. Further, on the surface of the screen plate, which is possible to the nozzles, are formed brushes 701 with the same pitch at positions adjacent to the openings.

A driving mechanism for moving the screen plate 705 constituting the brush unit B stated above is indicated by a reference mark C. That is, 711 is a pivoting plate and 712 is a threaded pivot supporting the pivoting plate 711 on the movable body 704. The pivoting plate 704 has a receiving hole 711*a*, through which a hanging portion 706*c* of the sleeve plate 706*a* passaes and a standing plate portion 711*b* obtained by bending a part thereof. A piston 715 of an air cylinder 714 supported by a frame member 713 secured to a side surface of the movable body 704 is linked with the standing plate portion 711*b*.

Figure 45:
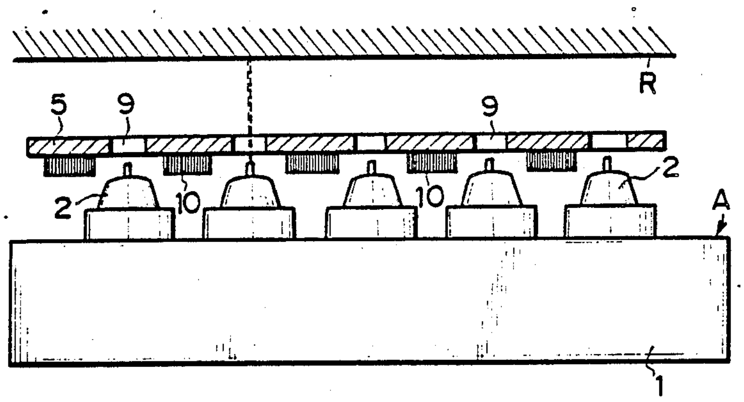
FIG. 45 is a plan view indicating the displacement position of the brush unit with respect to the spray gun unit during a printing operation.

In the ink spray gun device constructed as described above, at a printing operatioin the screen plate 705 of the brush unit B is moved in advance by operation the driving mechanism C to the positon indicated in FIG. 45. That is, when the openings 709 formed in the screen plate 705 are at the positions opposite to the nozzles 703 of the spray guns arranged in parallel, the ink ejected by the nozzle can pass through the openings 709 and reach the surface R, on which an image is to be printed.

Figure 46:
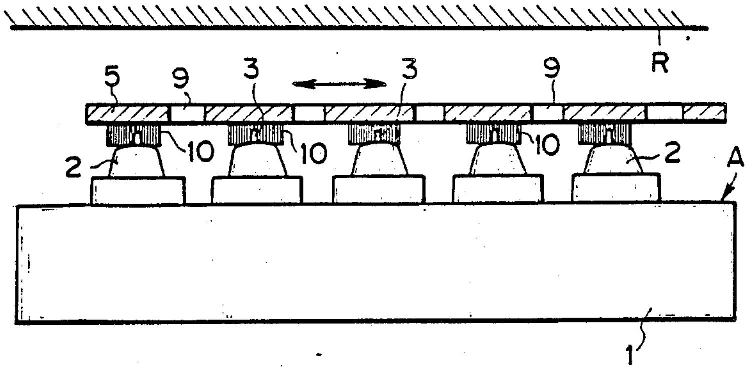
FIG. 46 is a plan view indicating the displacement position of the brush unit with respect to the spray gun unit during a nozzle cleaning operation.

Next, in the case where plugging of the nozzles or adhesion of nozzle extremities of the spraying guns is produced and it is necessary to clean them, the screen plate 705 is moved to the position, where the brushes 710 are opposite to the nozzles 703 to be in contact therewith, as indicated in FIG. 46. The nozzles of the spray guns arranged in parallel can be cleaned simultaneously by moving forward and backward the screen plate 705 at that position by operating the driving mechanism stated above.

Consequently according to the construction of the ink spray gun device described above, if plugging of the nozzles of the spray guns is produced during a printing work, it is possible to eliminate the plugging rapidly at the site of the printing work and to carry out the printing work without any long interruption. Further, since it is possible to clean simultaneously the nozzles of a number of spray guns arranged in parallel, the efficiency of the cleaning operation is very high. Furthermore, since remote control of the cleaning operation is possible, means for descending the spray gun unit at a work to print an image on a high wall surface is unnecessary, which can improve remarkably the efficiency of the printing work.

As described above, since the device described above is so constructed that the brush unit is mounted movably in front of the spray gun unit for printing images and the nozzles of the spray gun unit can be cleaned, depending on its displacement position, it is possible to effect an automatic cleaning operation to eliminate plugging of the nozzles or remove dirt stuck thereto and to try to reduce remarkably the labor for the nozzle cleaning operation and increase the efficiency of the printing work.

Figure 47:
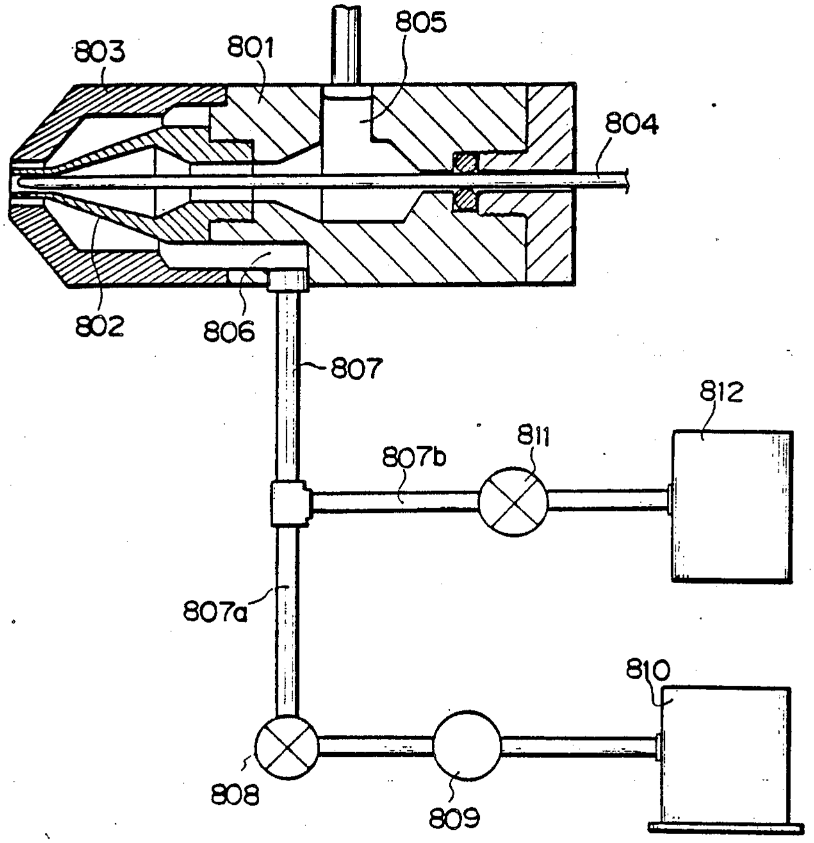
FIG. 47 is a scheme illustrating the construction of an ink spray gun device, which is still another embodiment of this invention, including a longitudinal cross-sectional view of a spray gun used therefor.
Figure 48A:
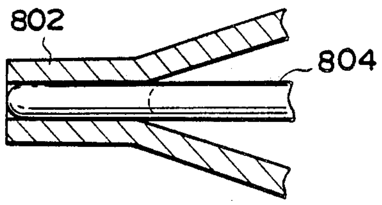
Figure 48B:
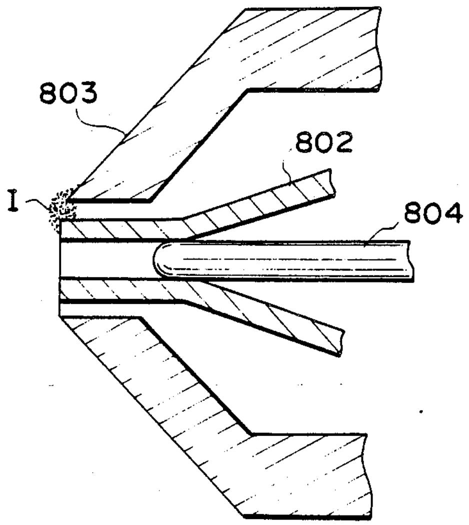

FIG. 47 shows still another embodiment of the ink spray gun device according to this invention, in which ink plugging an air ejecting opening between a nozzle and a cap can be rapidly and surely eliminated.

In the figure reference numeral 801 is a cylindrical main part of the spray gun; 802 is a nozzle; 803 is a cap; 804 is a needle member; 805 is an ink inlet; and 806 is an air inlet. A hose 807 connected with the air inlet 806 is ramified on the way. One branch hose 807*a* is connected with a compressed air supplying portion 810 such as an air compressor, etc. through an electro-magnetic valve 808 and a flow rate regulating valve 809 and the other branch hose 807*b* is connected with an ink solvent supplying portion 812 such as an alcohol tank through an electro-magnetic valve 811. Further, the ink inlet 805 is connected with an ink supplying portion (not shown in the figure) through a hose, etc.

in the ink spray gun device constructed as described above, at a printing operation, if the electro-magnetic valve 808 on the air supplying side is opened and the electro-magnetic valve 811 on the solvent supplying side is closed, the ink can be pulverized by the needle member 804.

Then, in the case where ink is stuck at the neighborhood of the nozzle and the nozzle is in the plugged state, the electro-magnetic valve 808 on the air supplying side is once closed and and the electro-magnetic valve 811 on the solvent supplying side is opened so that a suitable amount of solvent is sent out. Thereafter, when the electro-magnetic valve 808 is opened and the electro-magnetic valve 811 is closed, since the solvent is sent together with compressed air from the air room to the gap between the nozzle 802 and the cap 803 under pressure, the ink stuck at the neighborhood of the nozzle can be washed off. This cleaning operation is effected at a region, where the image is not printed.

As described above, since the device stated above is so constructed that the compressed air supplying portion and the ink solvent supplying portion can be switched to be connected with the air inlet in the ink spray gun, when the nozzle is plugged by ink stuck at the neighborhood thereof, it is possible to wash off rapidly and surely the plugging ink by sending solvent together with compressed air to the gap between the nozzle and the cap and thus an ink spray gun device having usability can be obtained.

As it is clear from the above explanation, according to this invention, it is possible to print automatically a desired color image directly on a surface such as a wall surface of a solid construction. Further, if a the driving mechanism for the spray gun head, which is supported by the frame described previously, an installation thereof at the site is easy and it can be easily moved. Other practical effects that it occupies no large floor space, that it is fairly cheaper than a prior art device, etc. are also remarkable.

The embodiments of the invention in which an exclusive property or privilege is claimed are defined as follows:

1. An automatic printing device comprising: a frame which can be installed arbitrarily with respect to an area on which an image is to be printed; supporting means for at least two-dimensionally movably supporting an ink spray gun unit; movement control means for moving said spray gun unit in response to control driving signals; and relaying control means disposed on a part of said frame for sending control driving signals to said movement control means and compressed air for spraying ink to said ink spray gun unit; wherein said relaying control means is so constructed that a compresed air inlet portion, a compressed air outlet portion, a compressed air pressure regulating portion, a power cable connector portion, and a pressure sensor cable connector portion are disposed in a relay box.

2. An automatic printing device comprising; a frame which can be installed arbitrarily with respect to an area on which an image is to be printed; supporting means for at least two-dimensionally movably supporting an ink spray gun unit; movement control means for moving said spray gun unit in response to control driving signals; and relaying control means disposed on a part of said frame for sending control driving signals to said movement control means and compressed air for spraying ink to said spray gun unit; wherein said spray gun unit is constructed so as to eject ink from a nozzle by the force of ejected air and has a driving mechanism for moving forward and backward a needle member disposed in said nozzle of said spray gun; and wherein said driving mechanism for moving forward and backward said needle member is a mechanism in which said neelde member is engaged with a tooth surface of a toothed wheel rotated by a stepping motor by pushing the former elastically towards the latter.

3. An automatic printing device comprising: a frame which can be installed arbitrarily with respect to an area on which an image is to be printed; supporting means for at least two-dimensionally movably supporting an ink spray gun unit; movement control means for moving said spray gun unit in response to control driving signals; and relaying control means disposed on a part of said frame for sending control driving signals to said movement control means and compressed air for spraying ink to said spray gun unit; wherein said spray gun unit is constructed so as to eject ink from a nozzle by the force of ejected air and has a driving mechanism for moving forward and backward a needle member disposed in said nozzle of said spray gun; and wherein said driving mechanism for moving forward and backward said needle member is a mechanism in which a movable ratchet plate, in which a number of receiving holes are formed with a constant pitch in the peripheral direction, is rotated by a motor, said movable ratchet plate working together with a fixed ratchet plate having balls freely falling in said receiving holes and emerging therefrom and being moved forward and backward in the axial direction, this movement being transmitted to said needle member.

4. An automatic printing device comprising: a frame which can be installed arbitrarily with respect to an area on which an image is to be printed; supporting means for at least two-dimensionally movably supporting an ink spray gun unit; movement control means for moving said spray gun unit in response to control driving signals; and relaying control means disposed on a part of said frame for sending control driving signals to said movement control means and compressed air for spraying ink to said spray gun unit; wherein said spray gun unit is constructed so as to eject ink from a nozzle by the force of ejected air and has a driving mechanism for moving forward and backward a needle member disposed in said nozzle of said spray gun; and wherein said driving mechanism for moving forward and backward said needle member is a mechanism in which forward and backward rotational movement of a rotation type solenoid member is transformed into forward and backward axis movement by helical movement of a screw, which axial movement is transmitted to said needle member.

5. An automatic printing device comprising: a frame which can be installed arbitrarily with respect to an area on which an image is to be printed; supporting means for at least two-dimensionally movably supporting an ink spray gun unit; movement control means for moving said spray gun unit in response to control driving signals; and relaying control means disposed on a part of said frame for sending control driving signals to said movement control means and compressed air for spraying ink to said spray gun unit; wherein said spray gun unit is constructed so as to eject ink from a nozzle by the force of ejected air and has a driving mechanism for moving forward and backward a needle member disposed in said nozzle of said spray gun; and wherein wherein said mechanism for moving forward and backward said needle member is a mechanism driven by a solenoid member.

6. An automatic printing device comprising: a frame which can be installed arbitrarily with respect to an area on which an image is to be printed; supporting means for at least two-dimensioinally movably supporting an ink spray gun unit; movement control means for moving said spray gun unit in response to control driving signals; and relaying control means disposed on a part of said frame for sending control driving signals to said movement control means and compressed air for spraying ink to said ink spray gun unit; and including a movable shutter capable of receiving ink ejected by a nozzle of said spray gun unit and a driving portion for driving said movable shutter are supported on said ink spray gun unit which ejects ink.

7. An automatic printing according to claim 6, wherein said shutter includes a flat plate and a plunger is used as said driving portion.

8. An automatic printing device according to claim 6, wherein said shutter includes an arc-shaped curved plate, whose base portion is supported rotatably, and a solenoid is used as said driving portion for rotating said arc-shaped curved plate.

9. An automatic printing device according to claim 8, wherein a sheet of blotting paper is disposed on an inner surface of said arc-shaped curved shutter so that it can be easily echanged.

10. An automatic printing device comprising a frame which can be installed arbitrarily with respect to an area on which an image is to be printed; supporting means for at least two-dimensionally movably supporting an ink spray gun unit in response to control driving signals; and relaying control means disposed on a part of said frame for sending control driving signals to said movement control means and compressed air for spraying ink to said ink spray gun unit; wherein said spray gun unit is so constructed that ink poured and stored therein is ejected from a nozzle thereof by the force of ejected air and the ejected amount of ink is regulated by forward and backward movement of a needle member inserted in the nozzle, and wherein said spray gun unit is disposed on a work table mounted on a movable body so that the inclination thereof can be varied.

11. An automatic printing device according to claim 10, wherein in the ink path within said spray gun unit at least a wall surface of an ink storing room is smooth without unevenness.

12. An automatic printing device comprising: a frame which can be installed arbitrarily with respect to an area on which an image is to be printed; supporting means for at least two-dimensionally movably supporting an ink spray gun unit; movement control means for moving said spray gun unit in response to control driving signals; and relaying control means disposed on a part of said frame for sending control driving signals to said movement control means and compressed air for spraying ink to said ink spray gun unit; wherein said spray gun unit includes a plurallity of ink spray guns arranged in parallel and a brush unti which is disposed movably in fron of the spray gun unit so that either openings in said brush unit through which ink ejected by said ink spray guns passes, or brushes on said brush unit which are in contact with nozzles of said ink spray guns and clean them, appear at positions, which are opposite to said nozzles, depending on the displacement position of said brush unit, said spray gun unit further including a driving mechanism for driving said brush unit.

13. An automatic printing device comprising: a frame which can be installed arbitrarily with respect to an area on which an image is to be printed; supporting means for at least two-dimensionally movably supporting an ink spray gun unit; movement control means for moving said spray gun unit in response to control driving signals; and relaying control means disposed on a part of said frame for sending control driving signals to said movement control means and compressed air for spraying ink to said ink spray gun unit; wherein said spray gun unit comprises an air ejection opening around an ink ejecting nozzle, an ink inlet to an ink room connected with said ink ejecting nozzle and an air inlet to an air room connected with said air ejection opening, wherein a needle member is disposed movably forward and backward through the ink room and the nozzle, and a selected one of a compressed air supplying portion and an ink solvent supplying portion is connected with said air inlet by a switching mechanism.

14. An automatic printing device comprising: a spray gun unit; control means for generating for said spray gun unit two-dimensional driving signals and ink ejection amount control signals respectively corresponding to the position and the color of each pixel in an original image; supporting means for supporting said spray gun unit for two-dimensional movement with respect to a surface on which the image is to be printed; and driving means responsive to said driving signals for driving said spray gun unit and at the same time responsive to said ink ejection amount control signals for projecting an ink jet from said spray gun unit to said surface on which the image is to be printed; wherein said spray gun unit includes a plurality of ink spray guns arranged in parallel; including a brush unit supported in front of said spray gun unit for movement between a first position in which a nozzle of each said spray guns is aligned with an opening through said brush unit for passage of an ink jet from such nozzle and a second position in which the nozzle of each said spray gun is aligned with a brush on said brush unit for cleaning the nozzle; and including driving means for moving said brush unit between said first and second positions thereof.

15. An automatic printing device comprising: a spray gun unit; control means for generating for said spray gun unit two-dimensional driving signals and ink ejection amount control signals respectively corresponding to the position and the color of each pixel in an original image; supporting means for supporting said spray gun unit for two-dimensional movement with respect to a surface on which the image is to be printed; and driving means responsive to said driving signals for driving said spray gun unit and at the same time responsive to said ink ejection amount control signals for projecting an ink jet from said spray gun unit to said surface on which the image is to be printed; wherein said spray gun unit includes an ink jet nozzle, an air jet outlet extending around an outer circumference of said ink jet nozzle, an ink inlet to an ink chamber communicating with said ink jet nozzle; an air inlet to an air chamber communicating with said air jet outlet, and a needle member supported for reciprocal movement in said ink chamber and said nozzle; and including a compressed air supply portion, an ink solvent supply portion and means for selectively coupling said air supply portion and said ink solvent supply portion to said air inlet.

* * * * *

UNITED STATES PATENT AND TRADEMARK OFFICE
CERTIFICATE OF CORRECTION

PATENT NO. : 4 937 678

DATED : June 26, 1990

INVENTOR(S) : Shuusei MURAI et al

It is certified that error appears in the above-identified patent and that said Letters Patent is hereby corrected as shown below:

Column 15, line 48; change "comprising;" to ---comprising:---.

line 63; change "neelde" to ---needle---.

Column 16, line 41; change "axis" to ---axial---.

line 57; delete "wherein".

line 58; after "said" insert ---driving---.

Column 17, line 7; after "printing" insert ---device---.

line 18; change "echanged" to ---exchanged---.

line 19; after "comprising" insert ---:---.

line 23; after "unit" insert ---; movement control means for moving said spray gun unit---.

line 37; change "a" to ---the---.

line 50; change "unti" to ---unit---.

line 51; change "fron" to ---front---.

Signed and Sealed this

Twelfth Day of November, 1991

*Attest:*

HARRY F. MANBECK, JR.

*Attesting Officer*

*Commissioner of Patents and Trademarks*